(12) United States Patent
Stevenson et al.

(10) Patent No.: US 11,378,685 B2
(45) Date of Patent: Jul. 5, 2022

(54) SYSTEMS, DEVICES, AND METHODS FOR DETERMINING SPACE OBJECT ATTITUDE STABILITIES FROM RADAR CROSS-SECTION STATISTICS

(71) Applicant: LeoLabs, Inc., Menlo Park, CA (US)

(72) Inventors: Matthew A. Stevenson, San Jose, CA (US); Michael Nicolls, Portola Valley, CA (US); Chris Rosner, Redwood City, CA (US)

(73) Assignee: LeoLabs, Inc., Menlo Park, CA (US)

( * ) Notice: Subject to any disclaimer, the term of this patent is extended or adjusted under 35 U.S.C. 154(b) by 284 days.

(21) Appl. No.: 16/574,464

(22) Filed: Sep. 18, 2019

(65) Prior Publication Data

US 2020/0278445 A1    Sep. 3, 2020

Related U.S. Application Data

(60) Provisional application No. 62/811,373, filed on Feb. 27, 2019.

(51) Int. Cl.
*G01S 13/933* (2020.01)
*G01S 13/10* (2006.01)

(52) U.S. Cl.
CPC .......... *G01S 13/933* (2020.01); *G01S 13/103* (2013.01)

(58) Field of Classification Search
CPC ................. G01S 13/933; G01S 13/103; G01S 2013/0254; G01S 13/88; G01S 13/951;
(Continued)

(56) References Cited

U.S. PATENT DOCUMENTS 2,471,284 A    5/1949   Rea
2,969,542 A    1/1961   Coleman et al.
(Continued)

FOREIGN PATENT DOCUMENTS

AU    2016246770    7/2020
CN    108287334     7/2018
(Continued)

OTHER PUBLICATIONS

Australia Office Action dated Oct. 7, 2019 for Serial No. 2016246770 filed Apr. 8, 2016 (5 pages).
(Continued)

*Primary Examiner* — Olumide Ajibade Akonai
(74) *Attorney, Agent, or Firm* — Dentons US LLP

(57) ABSTRACT

This disclosure enables various technologies for determining space object attitude stabilities from radar cross-section statistics. In particular, such determinations can be made via employing various phased-array radars with various fields of views, which can monitor various space objects (e.g., satellites, space debris, rocket bodies, space stations) over various periods of time (e.g., minutes, hours, days, weeks, months) as the space objects come into the fields of views. For example, a technique for estimating attitude stability of low-Earth RSOs using RCS statistics from various radars (e.g., group of radars, phased-array radar network). Assuming a non-isotropic shape, an Earth-oriented RSO can have an elevation-angle dependent RCS when viewed from a ground-based radar. Therefore, an RSO attitude stability can be tested by looking for a difference in a median or mean RCS when the RSO is viewed at different elevation angles.

34 Claims, 28 Drawing Sheets

(58) Field of Classification Search
CPC . G01S 13/66; G01S 7/41; G01S 7/415; G01S 7/412; G01S 13/726; G01S 13/584; G01S 13/582; G01S 13/90; G01S 13/89; G01S 13/56; Y02A 90/10

See application file for complete search history.

(56) References Cited

U.S. PATENT DOCUMENTS

| | | | |
|---|---|---|---|
| 3,612,845 | A | 10/1971 | Lawlor |
| 4,500,882 | A | 2/1985 | Katagi et al. |
| 4,769,777 | A | 9/1988 | Bittie et al. |
| 4,780,726 | A | 10/1988 | Archer et al. |
| 5,115,246 | A | 5/1992 | Thomas, Jr. et al. |
| 5,130,718 | A | 7/1992 | Wu et al. |
| 5,570,307 | A | 10/1996 | Takahashi |
| 5,748,140 | A | 5/1998 | Schober |
| 5,900,844 | A | 5/1999 | Hill |
| 5,936,568 | A * | 8/1999 | Berg .................. G01S 7/41 342/1 |
| 6,169,522 | B1 | 1/2001 | Ma et al. |
| 6,271,786 | B1 | 8/2001 | Huff et al. |
| 6,320,553 | B1 | 11/2001 | Ergene |
| 6,456,231 | B1 | 9/2002 | McEwan |
| 6,522,210 | B1 | 2/2003 | Dvorak et al. |
| 6,664,939 | B1 | 12/2003 | Olinyk et al. |
| 6,862,605 | B2 | 3/2005 | Wilber |
| 6,914,554 | B1 | 7/2005 | Riley et al. |
| 6,933,888 | B1 | 8/2005 | Schiffmiller et al. |
| 6,965,351 | B1 | 11/2005 | Miller et al. |
| 7,375,676 | B1 | 5/2008 | Loberger |
| 2003/0083063 | A1 | 5/2003 | Wang et al. |
| 2004/0008137 | A1* | 1/2004 | Hassebrock ............. B64G 3/00 342/75 |
| 2004/0259497 | A1 | 12/2004 | Dent |
| 2006/0132354 | A1 | 6/2006 | Beard et al. |
| 2007/0018882 | A1 | 1/2007 | Manoogian et al. |
| 2009/0066561 | A1 | 3/2009 | Yoshimura |
| 2013/0147658 | A1 | 6/2013 | Burri et al. |
| 2014/0225796 | A1 | 8/2014 | Chen et al. |
| 2015/0279103 | A1 | 10/2015 | Naegle et al. |
| 2016/0161604 | A1 | 6/2016 | Clark |
| 2020/0158862 | A1* | 5/2020 | Mahmoud .............. G01C 21/30 |

FOREIGN PATENT DOCUMENTS

| | | | |
|---|---|---|---|
| EP | 0919835 | 6/1999 | |
| EP | 2065731 A1 * | 6/2009 | .............. G01S 7/40 |
| EP | 2137789 | 5/2013 | |
| EP | 2637253 | 9/2013 | |
| WO | WO2002031915 | 4/2002 | |
| WO | WO2008114246 | 9/2008 | |
| WO | WO2016164758 | 10/2016 | |

OTHER PUBLICATIONS

Europe Supplementary Search Report dated Sep. 12, 2018 for Serial No. 16777378.7 filed Apr. 8, 2016 (10 pages).

International Search Report and Written Opinion dated Aug. 30, 2016 for Application No. PCT/2016/026697 filed Apr. 8, 2016 (11 pages).

International Search Report and Written Opinion dated Jan. 3, 2019 for Application No. PCT/US2018/055812 dated Jan. 3, 2019 (6 pages).

Rahmat-Samii et al., Advanced precipitation Radar antenna: array-fed offset membrane cylindrical reflector antenna, IEEE Transactions on Antennas and Propagation., vol. 53, No. 8, Aug. 2005, pp. 2503-2515.

International Search Report and Written Opinion dated Oct. 21, 2020 for Application No. PCT/US2020/019513 filed Feb. 24, 2020 (12 pages).

Li et al., Space Target Motion Attitude Discrimination based on RCS Time Sequence, ICSPS, 2016 (4 pages).

Stevenson et al., Space Object Attitude Stability Determined from Radar Cross-Section Statistics, AMOS, 2019(11 pages).

Wilden et al., GESTRA - A Phased-Array based surveillance and tracking Radar for Space Situational Awareness, IEEE, 2016 (5 pages). .

* cited by examiner

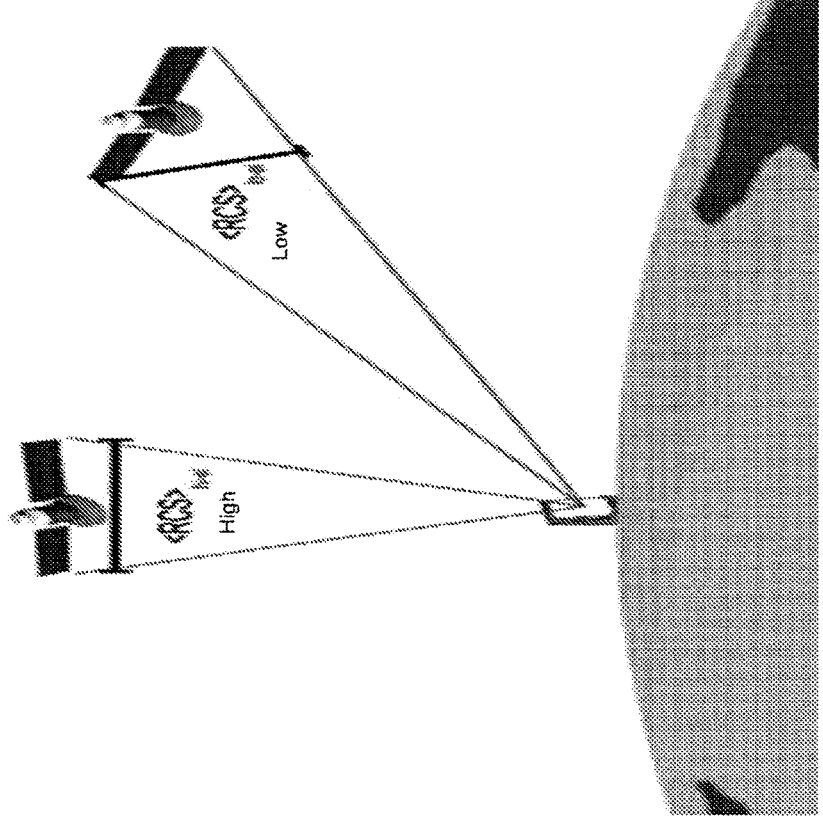
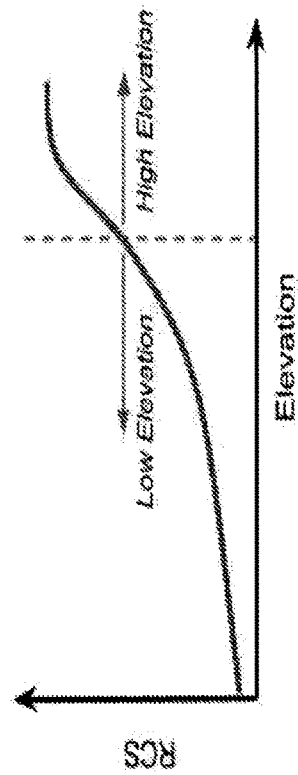
FIG. 3

FIG 20
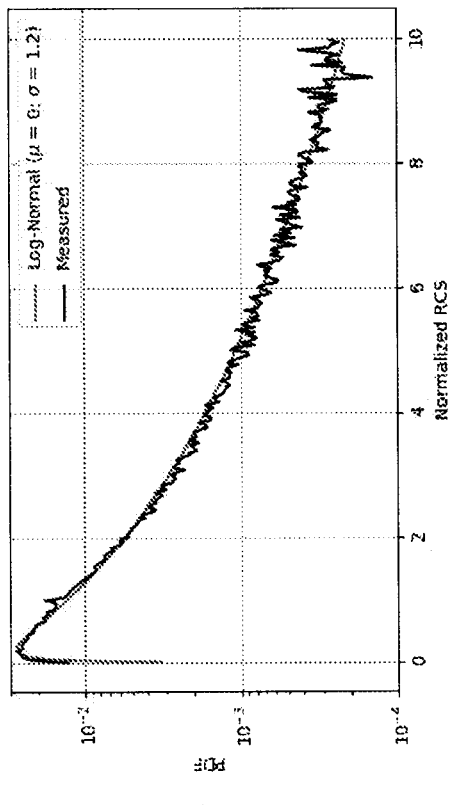
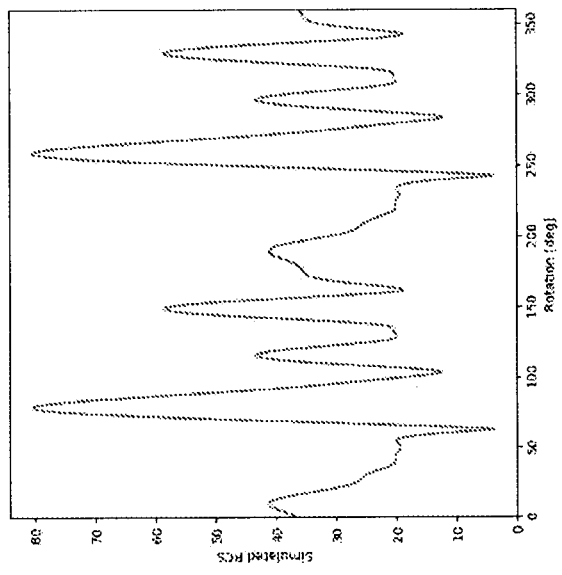

Stability Index = $\log[\langle RCS\rangle_{hi-el}/\langle RCS\rangle_{lo-el}]$

- RCS weighted median over 60 days:
  - Reduces overall variance, effects of outlier RCS measurements.
- Logarithm provides benefits:
  - Dynamic range for small or large differences in RCS.
  - Symmetric behavior for $\langle RCS\rangle_{hi-el}$ greater/less than $\langle RCS\rangle_{lo-el}$.
- Dynamically updated after new measurements, providing SI time series.

FIG. 21

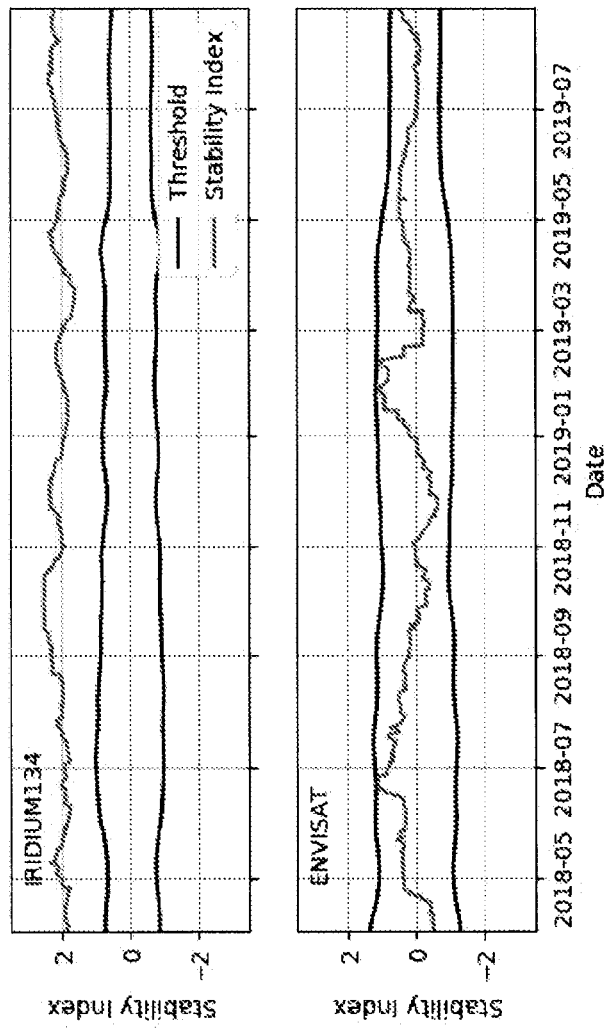
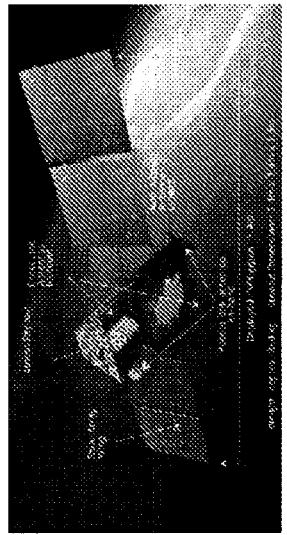
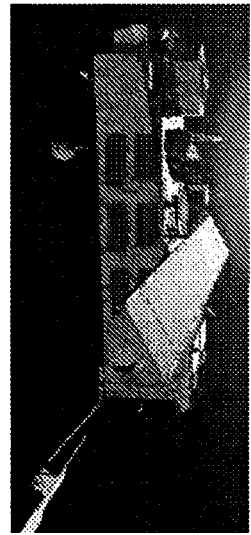
FIG. 23

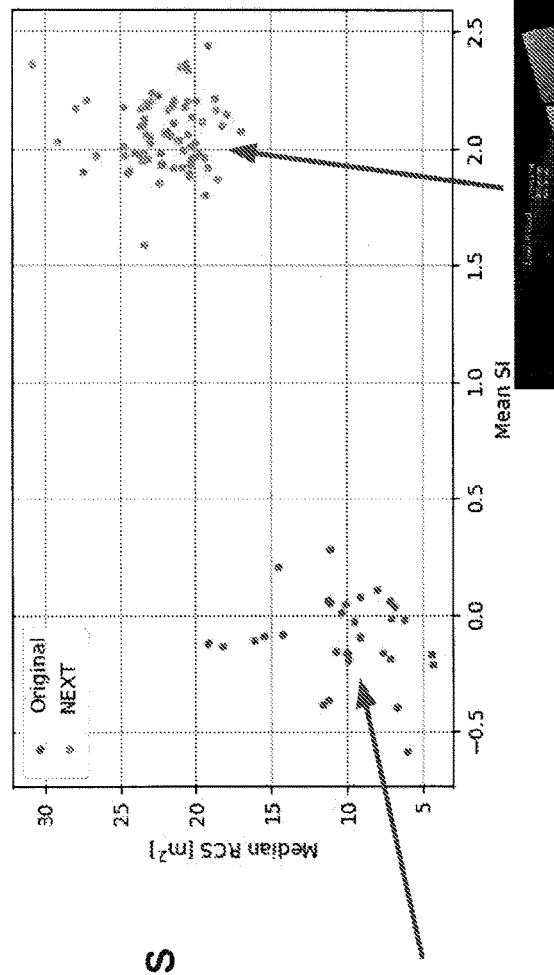
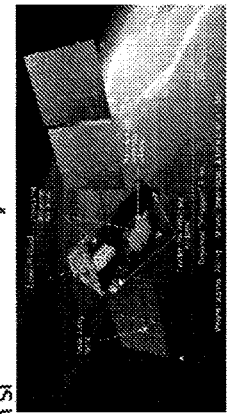
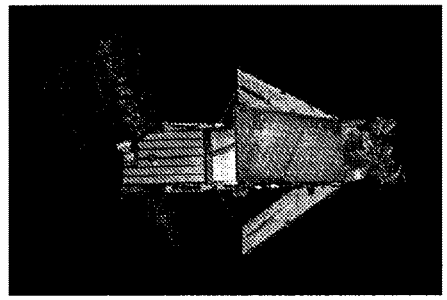
FIG. 24

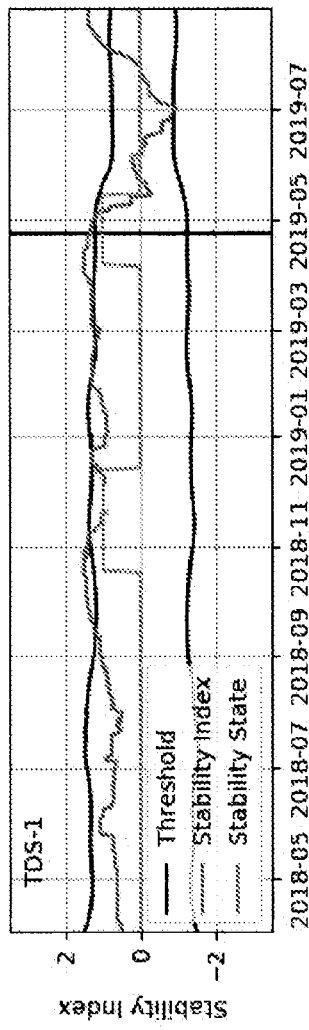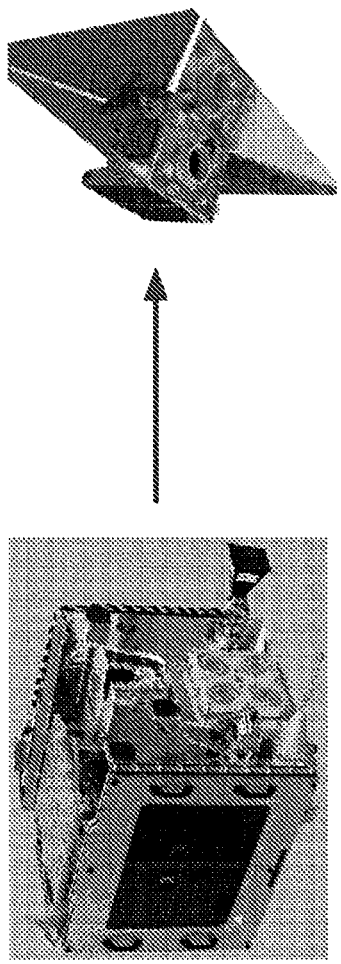
Images: SSTL
FIG. 25

SYSTEMS, DEVICES, AND METHODS FOR DETERMINING SPACE OBJECT ATTITUDE STABILITIES FROM RADAR CROSS-SECTION STATISTICS

CROSS-REFERENCE TO RELATED APPLICATIONS

This disclosure claims a benefit of priority to U.S. Provisional Patent Application 62/811,373 filed on Feb. 27, 2019, which is herein incorporated by reference for all purposes.

TECHNICAL FIELD

This disclosure relates to determining space object attitude stabilities.

BACKGROUND

There is a desire for a user (e.g., satellite operator, regulatory agency) to know whether or not a satellite has a stabilized attitude (e.g., rotational orientation with respect to Earth). In order to obtain this knowledge, a contiguous radar track (e.g., steerable radar dish) or an optical instrument (e.g., telescope) can be used. However, these technologies are laborious to manufacture, expensive to maintain, lacking in sufficient directivity, difficult to scale, complicated by weather, or limited due to physical size or altitude of the satellite.

SUMMARY

Broadly, this disclosure enables various technologies for determining space object attitude stabilities from radar cross-section statistics. In particular, such determinations can be made via employing various phased-array radars with various fields of views, which can monitor various space objects (e.g., satellites, space debris, rocket bodies, space stations) over various periods of time (e.g., minutes, hours, days, weeks, months) as the space objects come into the fields of views. For example, a technique can estimate attitude stability of low-Earth resident space objects (RSOs) using radar cross-section (RCS) statistics from various radars (e.g., group of radars, phased-array radar network). Assuming a non-isotropic shape, an Earth-oriented RSO can have an elevation-angle dependent RCS when viewed from a ground-based radar.

Therefore, an RSO attitude stability can be tested by looking for a difference in a median or mean RCS when the RSO is viewed at different elevation angles. For example, the technique can be performed using data from a radar (e.g., phased array) positioned in Earth's Northern Hemisphere, Southern Hemisphere, Eastern Hemisphere, Western Hemisphere (e.g., land-platform-based, land-vehicle-based, marine-vehicle-based, aerial-vehicle-based, marine-platform-based).

In an embodiment, a method comprises: receiving, via a processor, a plurality of RCS measurements of a space object from a radar having a field of view, wherein the RCS measurements are obtained from a plurality of passes of the space object into the field of view; estimating, via the processor, a first expected RCS value based on the RCS measurements when the space object is within the field of view at a first elevation angle relative to the radar, and a second expected RCS value based on the RCS measurements when the space object is within the field of view at a second elevation angle relative to the radar, wherein the first elevation angle is greater than the second elevation angle; determining, via the processor, a stability index (SI) based on the first expected RCS value and the second expected RCS value; receiving, via the processor, an RCS measurement from the radar when the space object is within the field of view at the first elevation angle or the second elevation angle, wherein the RCS measurement is received after the SI has been determined; inputting, via the processor, the SI into a finite state machine (FSM) after the SI is updated based on the RCS measurement being slidably windowed, wherein the FSM tracks the space object between a plurality of states; and taking, via the processor, an action based on a change detected in one of the states.

In an embodiment, a system comprises: a server programmed to: receive a plurality of RCS measurements of a space object from a radar having a field of view, wherein the RCS measurements are obtained from a plurality of passes of the space object into the field of view; estimate a first expected RCS value based on the RCS measurements when the space object is within the field of view at a first elevation angle relative to the radar, and a second expected RCS value based on the RCS measurements when the space object is within the field of view at a second elevation angle relative to the radar, wherein the first elevation angle is greater than the second elevation angle; determine an SI based on the first expected RCS value and the second expected RCS value; receive an RCS measurement from the radar when the space object is within the field of view at the first elevation angle or the second elevation angle, wherein the RCS measurement is received after the SI has been determined; input the SI into a FSM after the SI is updated based on the RCS measurement being slidably windowed, wherein the FSM tracks the space object between a plurality of states; and take an action based on a change detected in one of the states.

DESCRIPTION OF DRAWINGS

FIGS. 3-12 show an embodiment of a method for determining space object attitude stabilities from radar cross-section statistics according to this disclosure.

FIG. 20 shows a diagram of an embodiment of RCS distribution according to this disclosure.

FIG. 21 shows a diagram of an embodiment of an SI index according to this disclosure.

FIG. 23 shows a diagram of an embodiment of an SI for a plurality of space objects measured by date according to this disclosure.

FIG. 24 shows a diagram of an embodiment of a median RCS for a space object constellation measured by a mean SI according to this disclosure.

FIG. 25 shows a diagram of an embodiment of an SI measured by time for a threshold, an SI, and a stability state according to this disclosure.

DETAILED DESCRIPTION OF PREFERRED EMBODIMENTS

Figure 1:
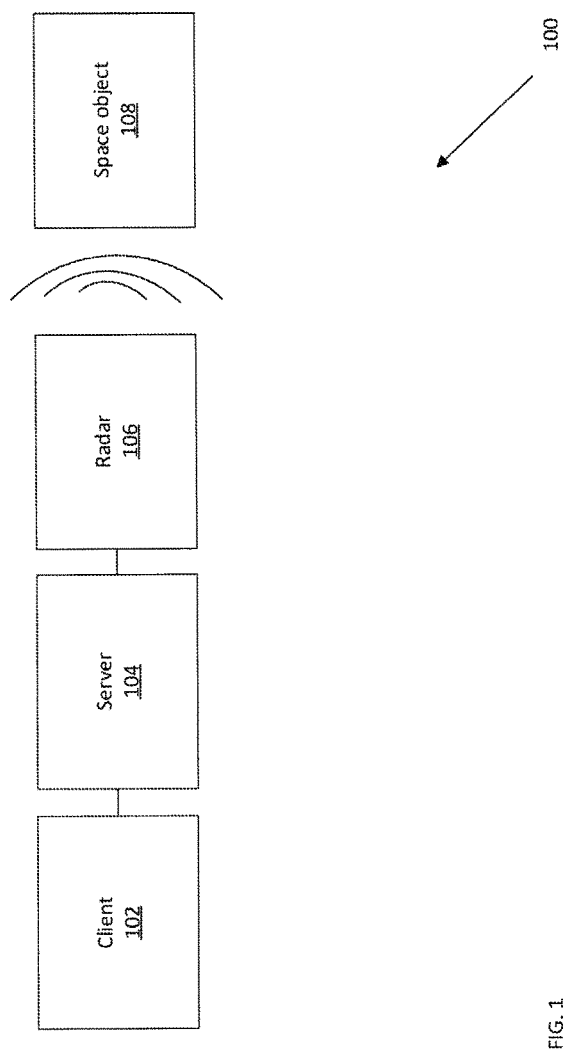
FIG. 1 shows a diagram of an embodiment of a network according to this disclosure.

Broadly, this disclosure enables various technologies for determining space object attitude stabilities from radar cross-section statistics. In particular, such determinations can be made via employing various phased-array radars with various fields of views, which can monitor various space objects (e.g., satellites, space debris, rocket bodies, space stations) over various periods of time (e.g., minutes, hours, days, weeks, months) as the space objects come into the fields of views. For example, a technique for estimating attitude stability of low-Earth RSOs using RCS statistics from various radars (e.g., group of radars, phased-array radar network). Assuming a non-isotropic shape, an Earth-oriented RSO can have an elevation-angle dependent RCS when viewed from a ground-based radar. Therefore, an RSO attitude stability can be tested by looking for a difference in a median or mean RCS when the RSO is viewed at different elevation angles. For example, the technique can be performed using data from a radar (e.g., phased array) positioned in Earth's Northern Hemisphere, Southern Hemisphere, Eastern Hemisphere, Western Hemisphere (e.g., land-platform-based, land-vehicle-based, marine-vehicle-based, aerial-vehicle-based, marine-platform-based).

As such, the technique can have applications for interpreting RSO stability, and its outputs can be used for advanced object or mission classification. For example, the radar can be positioned in North America, South America, Europe, Asia, Africa, Arctic, Antarctic, Texas, Alaska, Florida, New Zealand, Australia, Brazil, Argentina, Indonesia, Congo, Madagascar, Chile, South Africa, or others. For example, the radar can be a radar positioned in Midland, Tex. that operates in an ultra-high frequency (UHF) band. For example, the radar can be a one-dimensional or a multi-dimensional phased array radar. For example, the radar can track tens, hundreds, thousands or more of space objects per hour, or can be sensitive to space debris as small as 10 centimeters in diameter (or less).

This disclosure is now described more fully with reference to FIGS. 1-28, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

FIG. 1 shows a diagram of an embodiment of a network according to this disclosure. In particular, a diagram 100 includes a client 102, a server 104, a radar 106, and a space object 108. At least two of the client 102, the server 104, or the radar 106 can be local to or remote from each other.

The server 104 is in communication (e.g., wired, wireless, waveguide) with the client 102 and the radar 106. The client 102 can include a terminal (e.g., desktop, laptop, workstation, smartphone, tablet, workstation) and is operated by a user (e.g., satellite operator, regulatory agency). The server 104 can include a hardware or software service logic (e.g., web server, application server, database server, virtual server, cluster server).

The radar 106 includes a hardware or software logic that uses radio waves to determine range, angle, or velocity of an object. For example, the radar 106 can include a phased-array radar that includes a computer-controlled array of antennas which create a beam of radio waves that can be electronically steered to point in different directions, without moving the array of antennas. The radar 106 can have a plurality of fields of view. The radar 106 can be positioned in Earth's Northern Hemisphere, Southern Hemisphere, Eastern Hemisphere, Western Hemisphere (e.g., land-platform-based, land-vehicle-based, marine-vehicle-based, aerial-vehicle-based, marine-platform-based). For example, the radar 106 can be positioned in North America, South America, Europe, Asia, Africa, Arctic, Antarctic, Texas, Alaska, Florida, New Zealand, Australia, Brazil, Argentina, Indonesia, Congo, Madagascar, Chile, South Africa, or others. For example, the radar 106 can be positioned in Midland, Tex. that operates in an UHF band. For example, the radar 106 can be a one-dimensional or a multi-dimensional phased array radar. For example, the radar 106 can track tens, hundreds, thousands or more of the space objects 108 per hour, or can be sensitive to space debris as small as 10 centimeters in diameter (or less).

The space object 108 can include an object (e.g., satellite, space debris, rocket body, space station) that orbits Earth (e.g., geostationary orbit, geosynchronous orbit, low earth orbit, medium earth orbit, high earth orbit, non-earth orbit, planetary orbit, star orbit) or orbits other bodies. The space object 108 can have a radar cross-section and a non-isotropic shape that is readable via the radar 106. The space object 108 can have a plurality of elevation angles relative to the radar 106, where the angles are different from each other. The space object 108 can be Earth-oriented and have an elevation-angle dependent RCS when viewed from the radar 106. The space object 108 can include a plurality of photovoltaic panels that are deployed. The space object 108 can be non-spherical.

Figure 2:
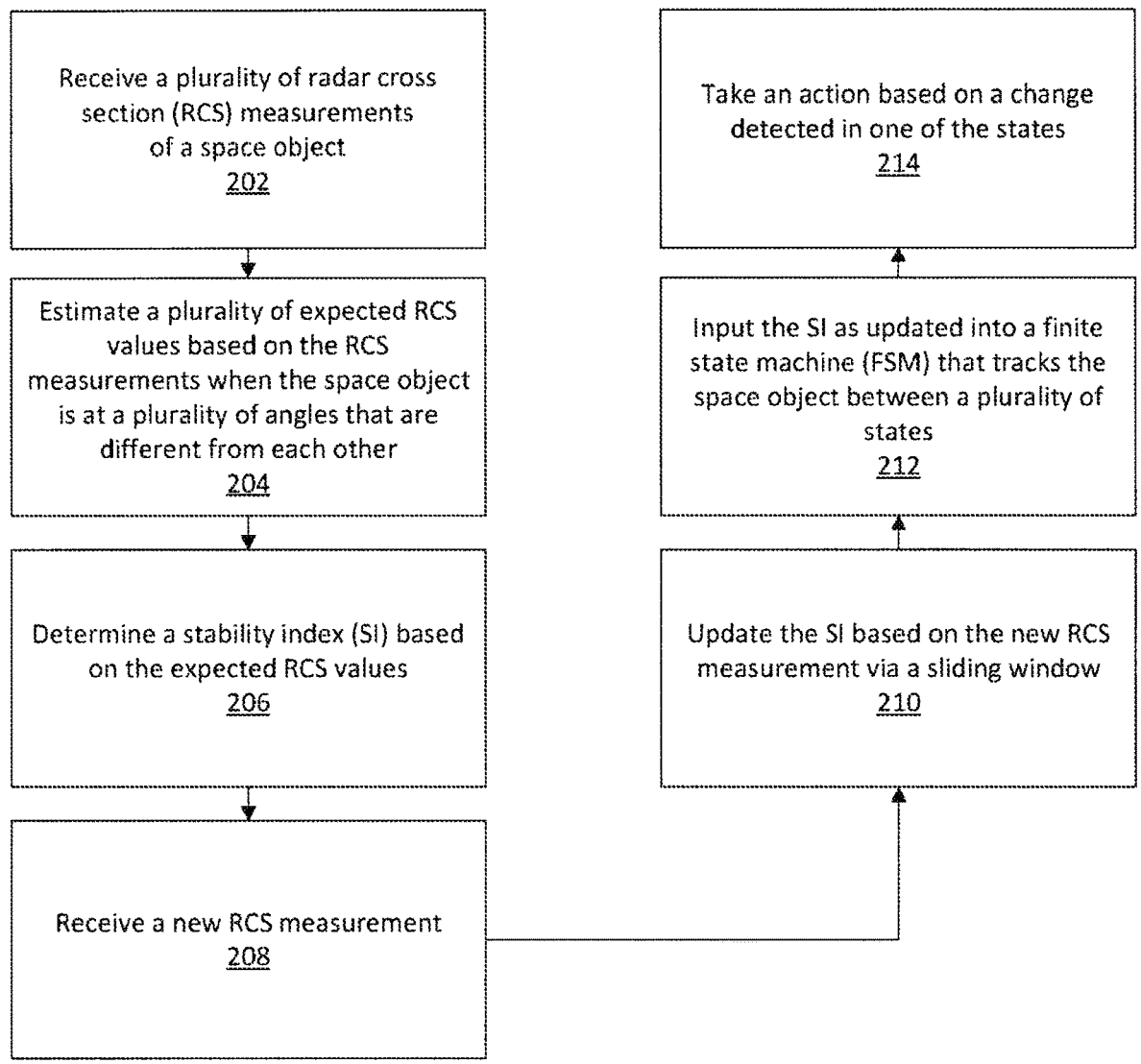
FIG. 2 shows a flowchart of an embodiment of a method for determining space object attitude stabilities from radar cross-section statistics according to this disclosure.

FIG. 2 shows a flowchart of an embodiment of a method for determining space object attitude stabilities from radar cross-section statistics according to this disclosure. In particular, a method 200 is performed via the network 100 and includes a plurality of blocks 202-214.

In block 202, a processor (e.g., server) receives a plurality of RCS measurements of the space object 108 from the radar 106 having a field of view, as disclosed herein. The RCS measurements are obtained from a plurality of passes of the space object 108 into the field of view of the radar 106, as the space object 108 travels in a planetary orbit (e.g., low earth orbit). The radar 106 can be a phased-array radar.

In block 204, the processor estimates a first expected RCS value (e.g., mean, median) based on the RCS measurements when the space object 108 is within the field of view at a first elevation angle relative to the radar 106, and a second expected RCS value (e.g., mean, median) based on the RCS measurements when the space object 108 is within the field of view at a second elevation angle relative to the radar 106, as disclosed herein. The first elevation angle can be greater than the second elevation angle. The first expected RCS value can be a median value or a mean value. The second expected RCS value can be a median value or a mean value.

In block 206, the processor determines an SI (e.g., ratio, log ratio, mean log ratio, median log ratio) based on the first expected RCS value and the second expected RCS value, as disclosed herein. The SI can be based on a ratio of the first expected RCS value and the second expected RCS value (e.g., first over second, second over first). The SI can be based on a logarithm of the ratio (e.g., base 10). For example, the SI can be exemplified via a log ratio. For example, one estimate of the log ratio can be a median log ratio or a mean log ratio.

In block 208, the processor receives a new RCS measurement from the radar 106 when the space object 108 is within the field of view at the first elevation angle or the second elevation angle, as disclosed herein. The new RCS measurement is received after the processor determines the SI. The new RCS measurement can be measured via the radar when the space object is within the field of view at the first elevation angle. The new RCS measurement can be measured via the radar when the space object is within the field of view at the second elevation angle.

In block 210, the processor updates the SI based on the new RCS measurement via a sliding window, as disclosed herein.

In block 212, the processor inputs the SI, as updated, into a FSM that tracks the space object 108 between a plurality of states, as disclosed herein. The states can include an attitude-stabilized state and an indeterminant state. The FSM can transition between the states via a comparison between the SI after the SI has been updated and at least one of an amplitude threshold or a time-based threshold. The FSM can transition between the states via a comparison between the SI before the SI has been updated and at least one of an amplitude threshold or a time-based threshold. The FSM can transition between the states via a comparison between the SI after the SI has been updated, the SI before the SI has been updated, an amplitude threshold, and a time-based threshold. The FSM can include a plurality of thresholds that are tuned via a random sampling simulation algorithm. The random sampling simulation algorithm can include a Monte Carlo simulation.

In block 214, the processor takes an action based on a change detected in one of the states, as disclosed herein. One of the states can be an attitude-stabilized state and the change can be detected in the attitude-stabilized state. The action can include triggering a software event associated with the change. The software event can be accessible via a front-end application programming interface (API) associated with the processor. When the SI is a first SI, then the action can include computationally associating the space object 108 with a constellation of space objects based on the first SI being sufficiently similar to a second SI based on a criterion (e.g., sufficiently close or equal in value or parameter or characteristic), where at least one member of the constellation of space objects is associated with the second SI. Note that the action can include other forms, such as creating a data structure, modifying a data structure, deleting a data structure, causing an input device to receive an input, causing an output device to output an output, or others.

FIGS. 3-12 show an embodiment of a method for determining space object attitude stabilities from radar cross-section statistics according to this disclosure. In particular, a technology can estimate an attitude stability of low-Earth RSOs using RCS statistics from a global radar network (e.g., LeoLabs global radar network). For example, the radar can be of a radar network including a plurality of radar sites. For example, at least two of the sites can be ground-based or can be in different locations. For example, at least one of the radar sites can include a phased-array radar.

Assuming a non-isotropic shape, an Earth-oriented RSO can have an elevation-angle dependent RCS when viewed from a ground-based radar (e.g., phased array radar). As such, an RSO attitude stability can be tested by looking for a difference in mean or median RCS when the Earth-oriented RSO is viewed at different elevation angles. This technology can be demonstrated using data from LeoLabs' Midland Space Radar (or other radars or groups of radars or radar networks as described herein). This technology has applications for interpreting RSO stability, and its outputs can be used for advanced object and mission classification.

1. INTRODUCTION

A requirement for Space Situational Awareness (SSA) is a characterization of RSOs. A characteristic of RSOs is their attitude stability. Specifically, there is a taxonomical interest whether an RSO has a controlled, stable attitude or a tumbling or irregular attitude. Further, tracking changes in the attitude stability of an RSO allows for the detection in on-orbit changes in the characteristics of that RSO, be they due to disabling or enabling of payload systems, RSO fragmentation, or some other cause.

The characterization of RSO attitude stability is challenging for several reasons. Resolved optical imaging of many RSOs is prohibitive due to the physical distance and size of the objects. This has led to a degeneracy in measurements between the attitude properties of an RSO and its physical shape. Studies have been performed to show the viability of separating the attitude and shape characteristics of RSOs using high time resolution photometric or radiometric measurements. These approaches have promise, but may be prohibitively expensive when scaled up to the larger RSO population.

There are an estimated 200,000 RSOs in Low-Earth Orbit (LEO) of size greater than 2 cm. In order to characterize the attitude stability of all of these objects, a low-cost, scalable method is needed. As such, what is presented is a technique for estimating the attitude stability of spatially unresolved RSOs in LEO using statistics of RCS measurements from various radar facilities (e.g., LeoLabs, NORAD, NASA, ESA, ROSCOSMOS). These RCS measurements are produced as a byproduct of orbital tracking measurements, and, sometimes, do not require additional radar resources. This technique's assumption about the shape of the RSOs is that their RCS is non-isotropic with respect to aspect angle. This assumption tends to hold true for RSOs with unequal spatial dimensions. For example, a satellite with large, deployed solar panels tend to satisfy this assumption, while spherical satellites sometimes tend not to.

This technique uses the statistics of RCS measurements of an RSO as the RSO passes above a radar, as disclosed herein, over several or many orbits and a wide variety of aspect angles. Using these RCS statistics, an SI is constructed. Section 2 describes the SI, Section 3 explains how the SI is used to classify the attitude stability of RSOs, and Section 4 presents several case studies demonstrating practical applications of the SI. Section 5 discusses how the SI is expected to improve in the future. Finally, Section 6 provides some conclusions. For example, LeoLabs operates and continues to build a network of dedicated radar sites around the globe at least for the purpose of tracking RSOs in LEO. This technique makes use of the data from a Midland Space Radar (MSR) in Midland, Tex. and can be extended to other LeoLabs radar facilities in Alaska, New Zealand, and other locations.

2. STABILITY INDEX (SI)

There is a desire to characterize the attitude stability of an RSO via its RCS statistics. In this technique, an attitude stabilized RSO can be defined as one whose attitude is nearly constant relative to the orbital frame. This technique assumes that the RSO has different mean or median RCS values when viewed from different aspect angles.

In some embodiments, there is a benefit of working with mean or median RCS values, rather than individual RCS measurements. This can be so because small changes in aspect angle can result in large changes in measured RCS for complex radar targets. This effect can be so pronounced that it is often convenient to treat RCS measurements as drawn randomly from a probability distribution function. Thus, estimating the mean or median of the measured RCS values over a period of several weeks provides a more direct probe of the target's radar reflection properties than any one individual RCS measurement. Sometimes, the median rather than the mean of the RCS measurements can be used to make the result less sensitive to outlier RCS measurements.

If an RSO with non-isotropic RCS is attitude stabilized, then its median RCS can vary with the topocentric view-angle with which it is measured (see FIG. 3). Conversely, if the RSO is tumbling, then it will present a random aspect to the radar regardless of topocentric view-angle. This will lead to a mean or median RCS which is independent of topocentric view angle. Note that FIG. 3 is a schematic drawing 300 of the approximate mean or median RCS of a stabilized satellite, as viewed from different aspect angles. When the satellite is viewed from lower elevation relative to the radar site, then the satellite presents a smaller geometric cross-section to the radar, resulting in a lower mean or median RCS.

A metric for attitude stabilization, as disclosed herein, exploits this concept by comparing the mean or median RCS of a satellite measured at high elevation to the mean or median RCS of that satellite measured at low elevation. More precisely:

$$SI = \log_{10} \frac{\langle RCS_{hi-el} \rangle}{\langle RCS_{lo-el} \rangle} \quad \text{Equation 1}$$

For an attitude-stabilized RSO with non-isotropic RCS, the SI of equation 1 will tend to be non-zero. If the RSO presents its largest RCS to nadir, then the SI will tend to be positive. If the RSO presents its smallest RCS to nadir, then the SI will tend to be negative.

The use of the logarithm is chosen for two reasons: the ratio is observed to span several orders of magnitude, and the logarithm has symmetric scaling when $\langle RCS_{hi-el} \rangle > \langle RCS_{lo-el} \rangle$ and when $\langle RCS_{hi-el} \rangle < \langle RCS_{lo-el} \rangle$.

In an embodiment of this metric, a weighted median (or mean) is chosen for use over a 60 day timescale (although higher or lower day counts is possible). The weighted median was selected because it combines the median's lack of sensitivity to outliers with the weighted mean's emphasis of slowly varying structure over uncorrelated statistical noise. The 60 day timescale was selected because it was observed to provide significant additional suppression of short-term variation in archival MSR data (although other time scales lesser or greater are possible). As more radar facilities are added to a radar network, an increased amount of data can allow to shorten this timescale significantly. This is discussed further in Section 5.

A weighted median (or mean) of a set of unevenly time-sampled RCS measurements is determined as follows. When a new RCS measurement for a given RSO is made at high or low elevation, some, many, most, or all previous RCS measurements for that RSO at high or low elevation in the past 60 days (or other time period) is selected. For example, the time period can be days, weeks, or months. Then, a weight is assigned to some or each of those RCS measurements using a Hamming window (or another windowing function), with end point at the present measurement and start point 60 days prior. Then the RCS measurements, and their corresponding weights, are sorted in increasing RCS order. The cumulative sum of the sorted weights is calculated, and the index at which that cumulative sum exceeds half of the sum of all weights is index of the weighted median RCS.

After some or each update to the weighted median RCS for an RSO, whether at high or low elevation, the SI is re-calculated. In this way, a time series of the SI is formed, which is updated whenever an RCS measurement of the RSO is made. In some embodiments, the non-isotropic RCS assumption can be important because this approach may not be capable of distinguishing an attitude-stabilized sphere from a tumbling sphere, for example. Therefore, a null SI detection can be consistent with an attitude-controlled RSO with an isotropic RCS. However, the non-isotropic RCS assumption can be avoided in other embodiments.

Some attitude-controlled satellites may be commanded to have many different attitudes during a 60-day period (or another time period). For example, the time period can be hours, days, weeks, or months. The SI is designed to detect if RSOs always present the same aspect to nadir, so an active satellite that is undergoing desired attitude changes many times during an SI calculation time window will tend to have a null SI value. The 60-day period is expected to decrease more radar network facilities become operational, so a gain in SI sensitivity for such satellites is expected in the future.

3. STABILITY CLASSIFICATION

Classifying RSOs based upon the SI is non-trivial. There is a balance of the competing concerns of designing a classification which is responsive to changes in RSO behavior, while minimizing confusion due to the statistical nature of RCS measurements. This is further complicated by the fact that there can be a limited quantity of reference data upon which to train a classification algorithm.

The technique uses Monte Carlo simulations (or other random sampling simulation) with RCS values drawn from an empirically chosen distribution function. Further, the technique enables setting a target false-positive rate for stability classification and back-calculate the appropriate SI thresholds as a function of the number of measurements used and their signal-to-noise ratio (SNR). Furthermore, an ensemble of SI time series can be simulated in order to calculate a necessary period of time for the SI to remain across a threshold before we change the RSO's stability classification. As with the SI thresholds, these time thresholds are selected to give a target false-positive rate for changes in stability classification. The measured RCS values have been found to follow a log-normal distribution.

$$P(x) = \frac{1}{x\sigma\sqrt{2\pi}} \exp\left(-\frac{(lnx - \mu)^2}{2\sigma^2}\right)$$ Equation 2

Figure 4:
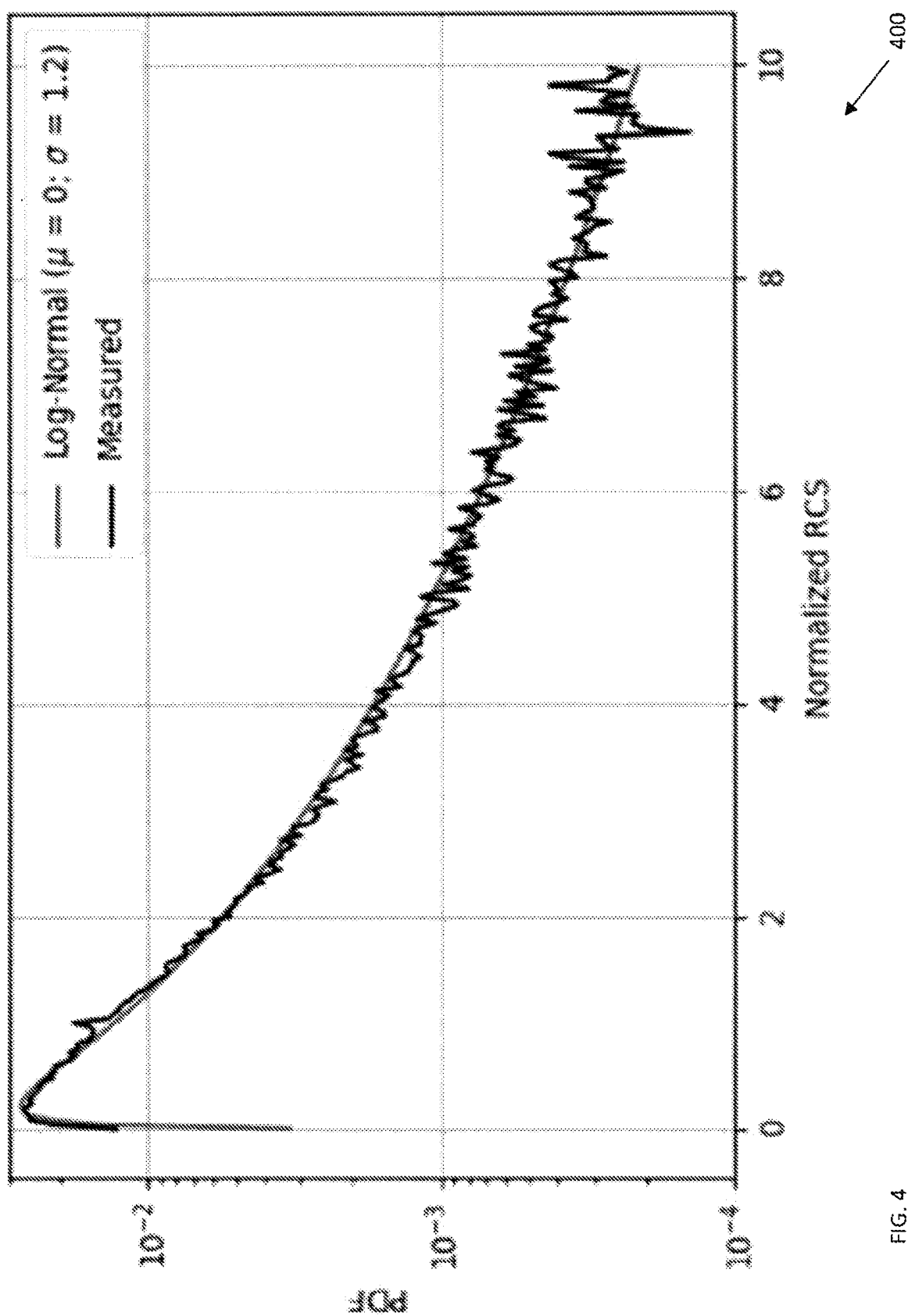

The probability distribution function (PDF) of the RCS measurements was estimated by taking our RCS measurements for a given RSO, normalizing those measurements by the median RCS of that RSO, and then estimating the PDF by constructing a histogram. This was repeated for some, many, most, or all RSO's for which there are RCS measurements. The resulting PDF estimates are shown in FIG. 4, as well as an analytical log-normal curve with $\mu=0$ and $\sigma=1.2$. In some embodiments, this is not unexpected, as a log-normal distribution is often used to model RCS measurements. Therefore, using a log-normal PDF for RCS Monte Carlo simulations is justified.

The Monte Carlo selection of SI thresholds is performed by simulation a large ensemble of RSOs with various isotropic RCS values and numbers of measurements. For a given iteration, the timing of the measurements are drawn from the Dirichlet distribution (or another of distribution of continuous multivariate probability distributions) (to simulate infrequent RCS measurements) over a 60 day period (or another time period), and the elevations of those measurements were drawn from a uniform distribution. For example, the time period can be days, weeks, or months. The actual RCS values are drawn from the log-normal distribution with $\mu=0$ and $\sigma=1.2$. Given the known radar properties, the expected SNR for those measurements is determined, allowing to add additional Gaussian noise (to simulate measurement noise) and apply a threshold to simulate our radar sensitivity limit (RCS-to-SNR conversation can be elevation dependent, which can introduce a noticeable bias in the SI). Thus, an estimate of the SI for this iteration of the Monte Carlo simulation can be achieved. This process is repeated to create a large ensemble of RSOs with varying RCS values and numbers of measurements. Note that FIG. 4 is a diagram 400 of measured PDF of RCS measurements for all RSOs, normalized to <RCS>=1. A log-normal curve is plotted for reference, with $\mu=0$ and $\sigma=1.2$. It is clear that the log-normal curve offers a good description of the measured PDF out to a normalized RCS of 10.

Then, the ensemble of SI values is placed into bin according to their SNR values and statistical weights. The statistical weight is defined as the sum of all Hamming weights of the measurements for the given SI value. In each bin, a histogram of the SI values is constructed and a selection of SI thresholds allowing 1% and 10% false positive rates is made. These thresholds vary approximately linearly with SNR and numbers of measurements, so a linear function is fit to them. Using this linearly varying threshold function, the appropriate thresholds for a given SI value can be determined given the SNR and number of the individual measurements that led to that SI value.

Figure 5:
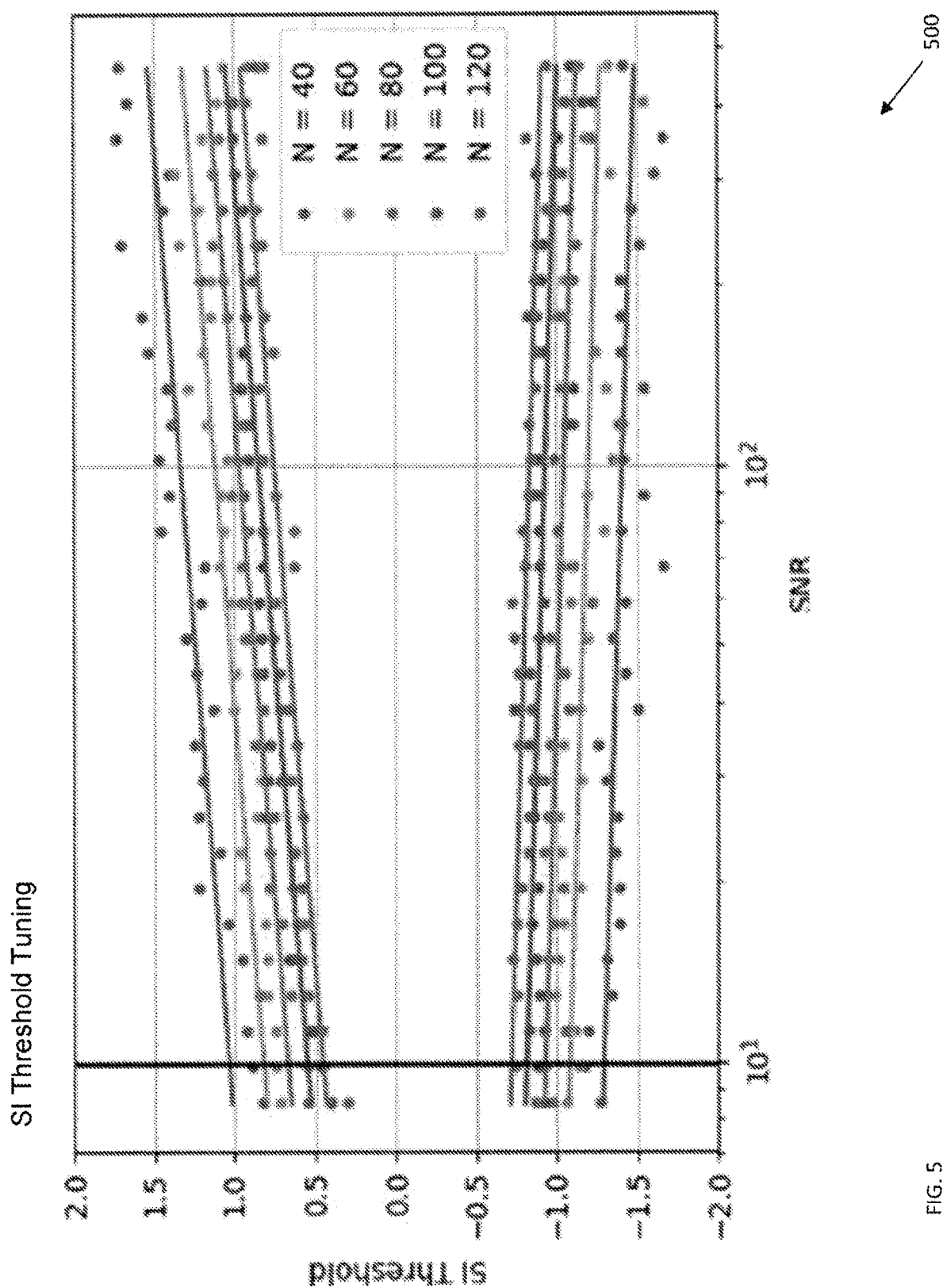

An example 500 of this for the 10% threshold is shown in FIG. 5. In this figure, there is a clear bias towards negative SI values due the measurement SNR threshold. Perhaps counter-intuitively, the thresholds become higher as SNR increases. The reason for this is that the variance of the log-normal distribution increases with its median. Thus, because SNR is correlated with RCS, the higher SNR targets will tend to have greater variance in their SI metrics. Note that FIG. 5 shows Monte Carlo results for the 10% false-positive rate thresholds as a function of measurement SNR and statistical weight N. The linear model to the thresholds is shown as the solid lines.

Figure 6:
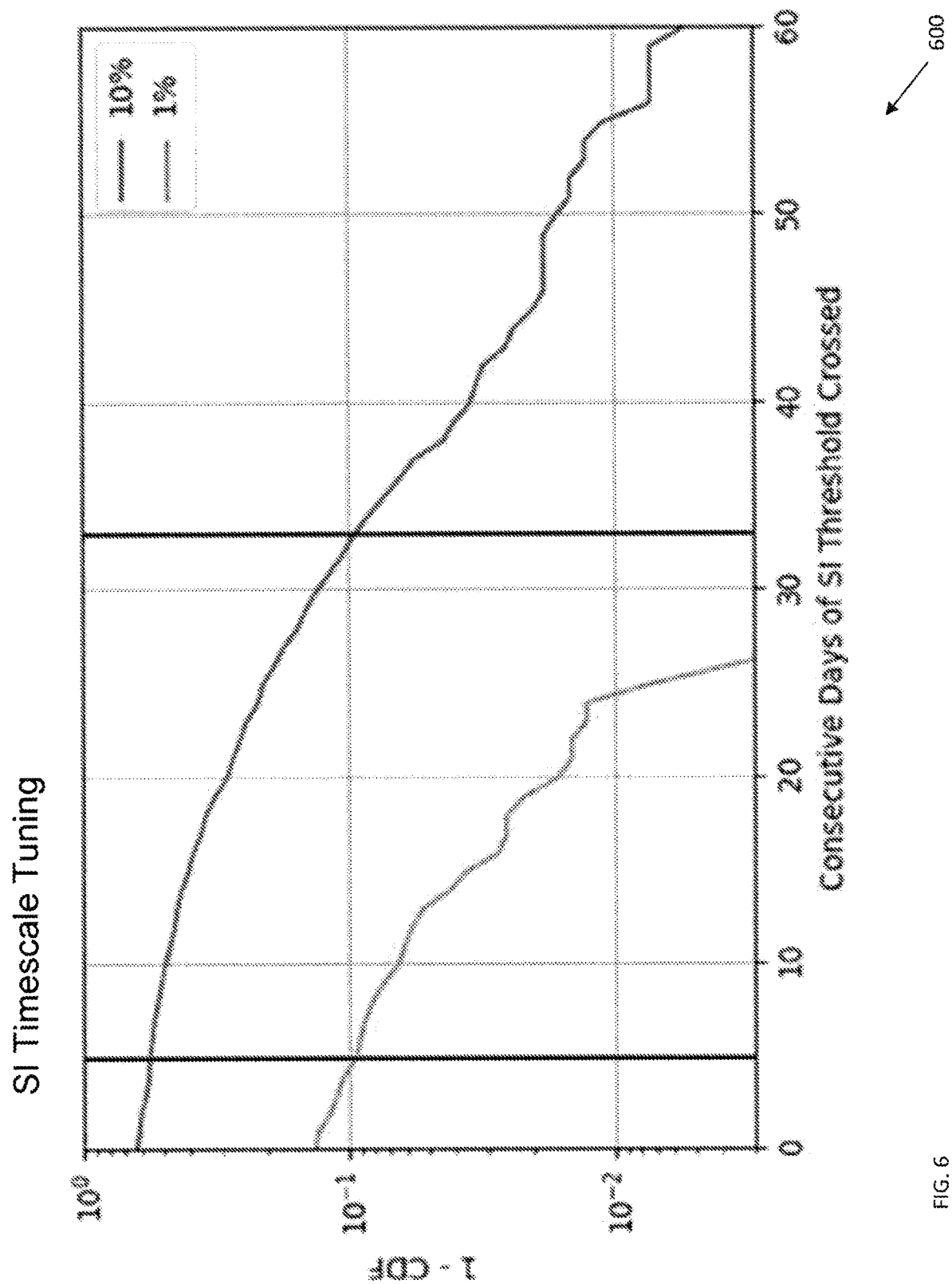

With SI thresholds in hand, an ensemble of SI time series and their corresponding 1% and 10% thresholds is simulated. Then time thresholds are selected such that only 10% of isotropic RCS RSOs will cross the SI thresholds for that period of time in a year of measurements. This is shown in a diagram 600 of FIG. 6. Thus, the time thresholds for the stability classification are computed. Note that FIG. 6 shows Monte Carlo results for the probability than an isotropic RCS RSO will have an SI across the 1% or 10% threshold for a given number of consecutive days in one year. This is calculated as one minus the cumulative distribution function (CDF) of the number of consecutive days that such an RSO is across the SI threshold. The vertical black lines show the time threshold giving a 10% annual false-positive rate.

Figure 7:
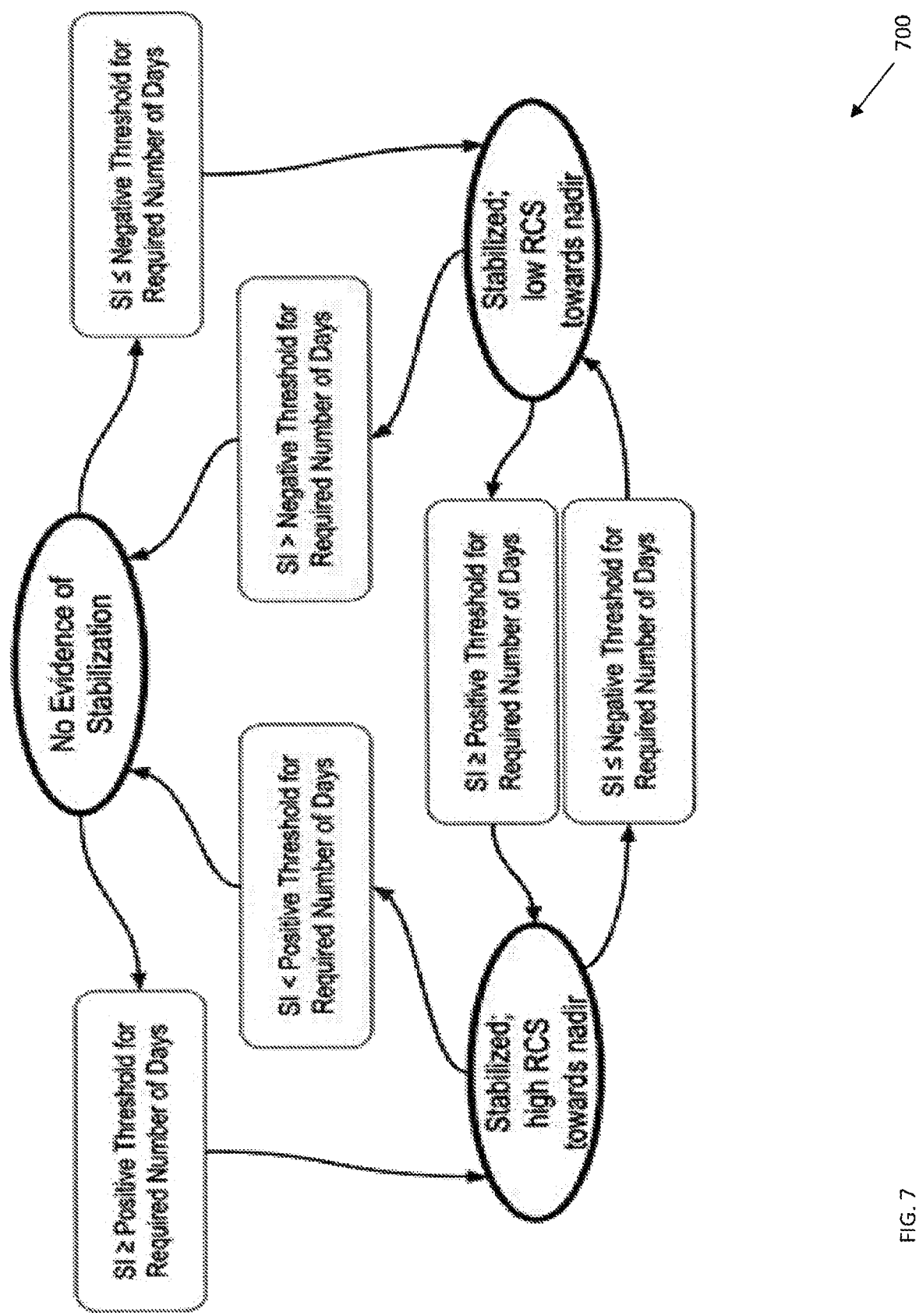

The stability classification algorithm applies the above SI and time thresholds to the data via a state machine. Each RSO is initially assumed to be in the non-stabilized state prior to data collection. If, during the course of RCS measurements, that RSO is found to have an SI beyond the thresholds, then the stability classification state of that RSO will remain unchanged. A stability classification state transition will only occur after the SI is seen to be beyond the threshold for a period of time greater than the time thresholds. This algorithm 700 is illustrated in FIG. 7. Note that FIG. 7 shows the stability classification algorithm where if the SI exceeds a positive or negative threshold for the required number of consecutive days, then a stability classification state transition occurs.

Figure 8:
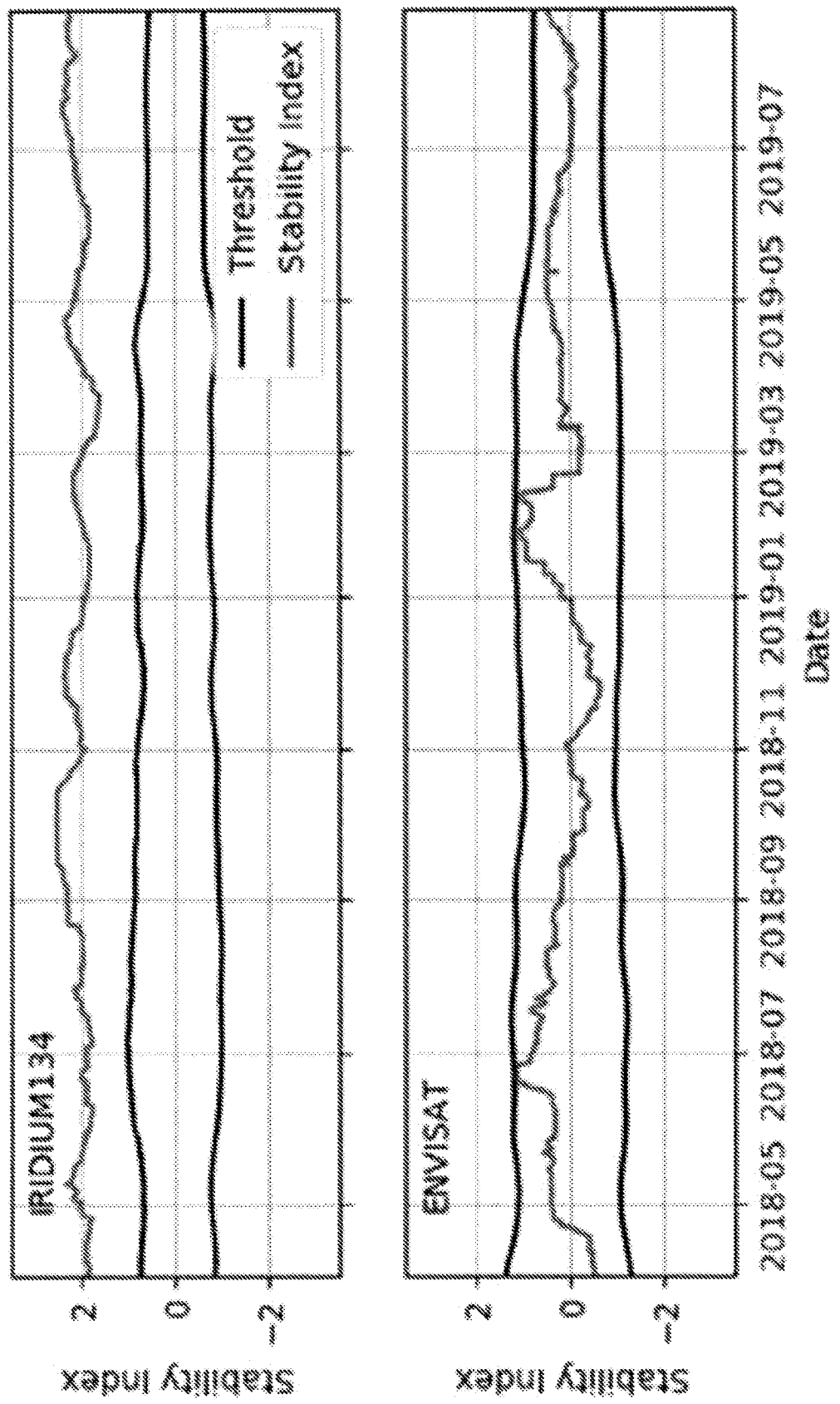

FIG. 8 shows a diagram 800 of example SI curves for two RSOs. The top panel shows Iridium 134 (NORAD ID 43075), which has a clear, consistent stability signal. The stability classification algorithm identifies Iridium 134 as stabilized. The bottom panel shows Envisat (NORAD ID 27386) with no clear stability signal. The algorithm classifies Envisat as having no evidence for stabilization. This is consistent with independent measurements showing evidence for the uncontrolled tumbling of Envisat. Note that FIG. 8 shows diagrams 800 disclosing SI time series for the Iridium 134 (NORAD ID 43075) and Envisat (NORAD ID 27386) satellites. The black curves are the 10% false-positive thresholds for these data sets. Iridium 134 shows a clear, consistent attitude stabilization signal, while Envisat shows no such signal.

4. EXAMPLE APPLICATIONS

4.1 TDS-1 Deorbit Sail Deployment

TechDemoSat-1 (TDS-1, NORAD ID 40076) is an attitude-controlled satellite built by a consortium led by Surrey Satellite Technology Ltd. It contains a wide variety of technology demonstration payloads, including a Deorbit Sail (DOS). The DOS was deployed on Apr. 24, 2019.

Figure 9:
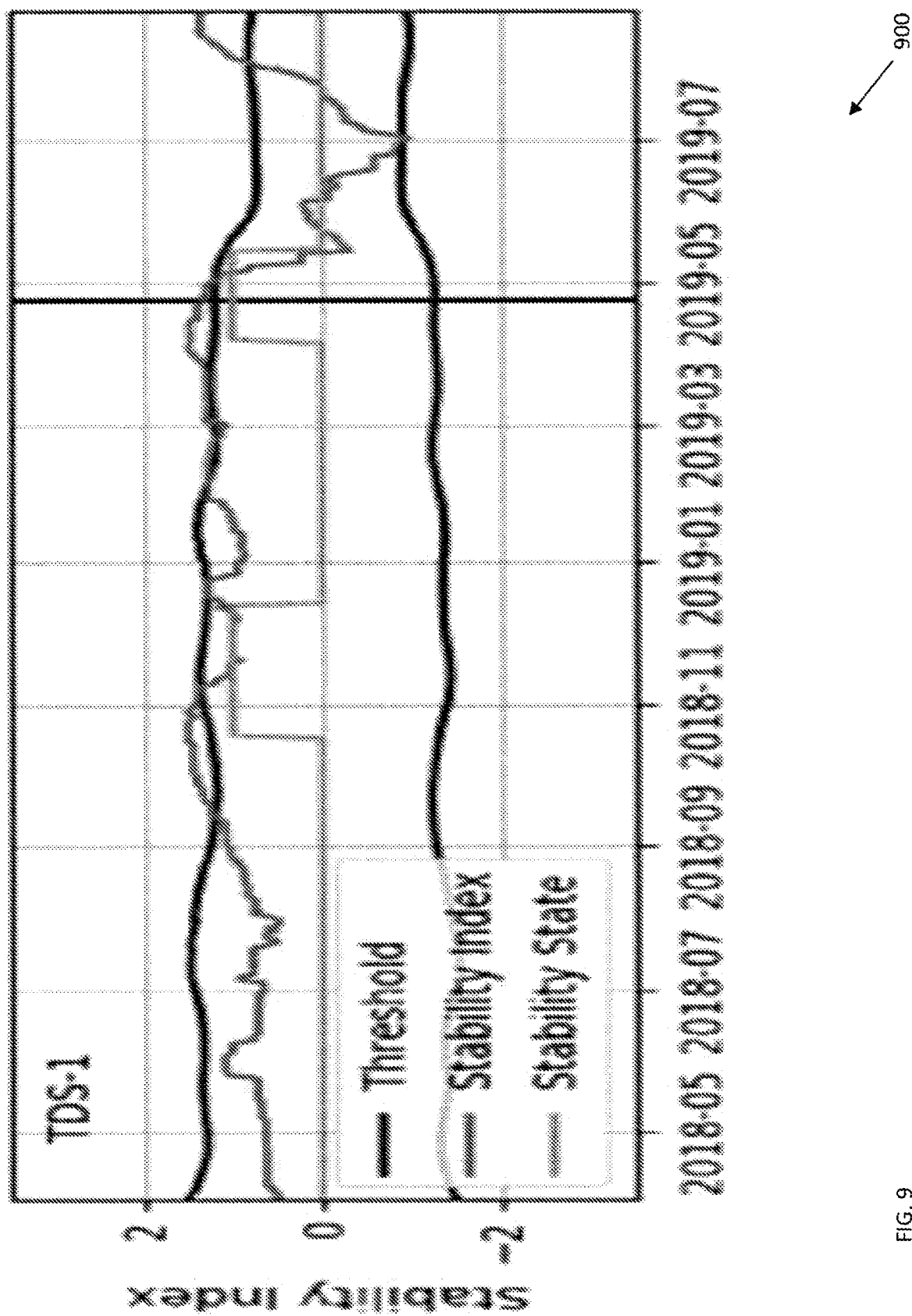

The SI for TDS-1 is shown in FIG. 9 as a diagram 900. The date of the DOS deploy is indicated by a vertical black line. Prior to the deployment, the SI was hovering near the positive threshold. Immediately after the sail deployment, the SI began to show much greater variability. This shows a clear change in the attitude behavior of TDS-1, which is consistent with either a change in RSO attitude (such that the maximum RCS is no longer presented to nadir) or a loss of attitude control.

FIG. 9 also shows the stability classification state for TDS-1 during this period of time. Prior to the DOS deploy event, the SI was near the SI threshold, causing the state to waver. Section 5 discusses how the future addition of new radar sites will improve this performance. Note that FIG. 9 presents the SI time series for the TDS-1 (NORAD ID 40076) satellite. The black curves are the 10% false-positive thresholds for this data set, and the orange line illustrates the attitude stability classification state (low indicating no evidence of stabilization, high indicating attitude stabilization). The DOS deploy event on Apr. 24, 2019 is indicated by a solid, vertical black line.

4.2 Identification of Iridium Satellites

Iridium Communications has launched nearly 200 satellites for global telecommunications services. Their original constellation was launched between 1997 and 2002, and they launched a newer constellation (called Iridium NEXT) between 2017 and 2019. Of particular interest to this disclosure, the two constellation are significantly different in physical shape.

Figure 10:
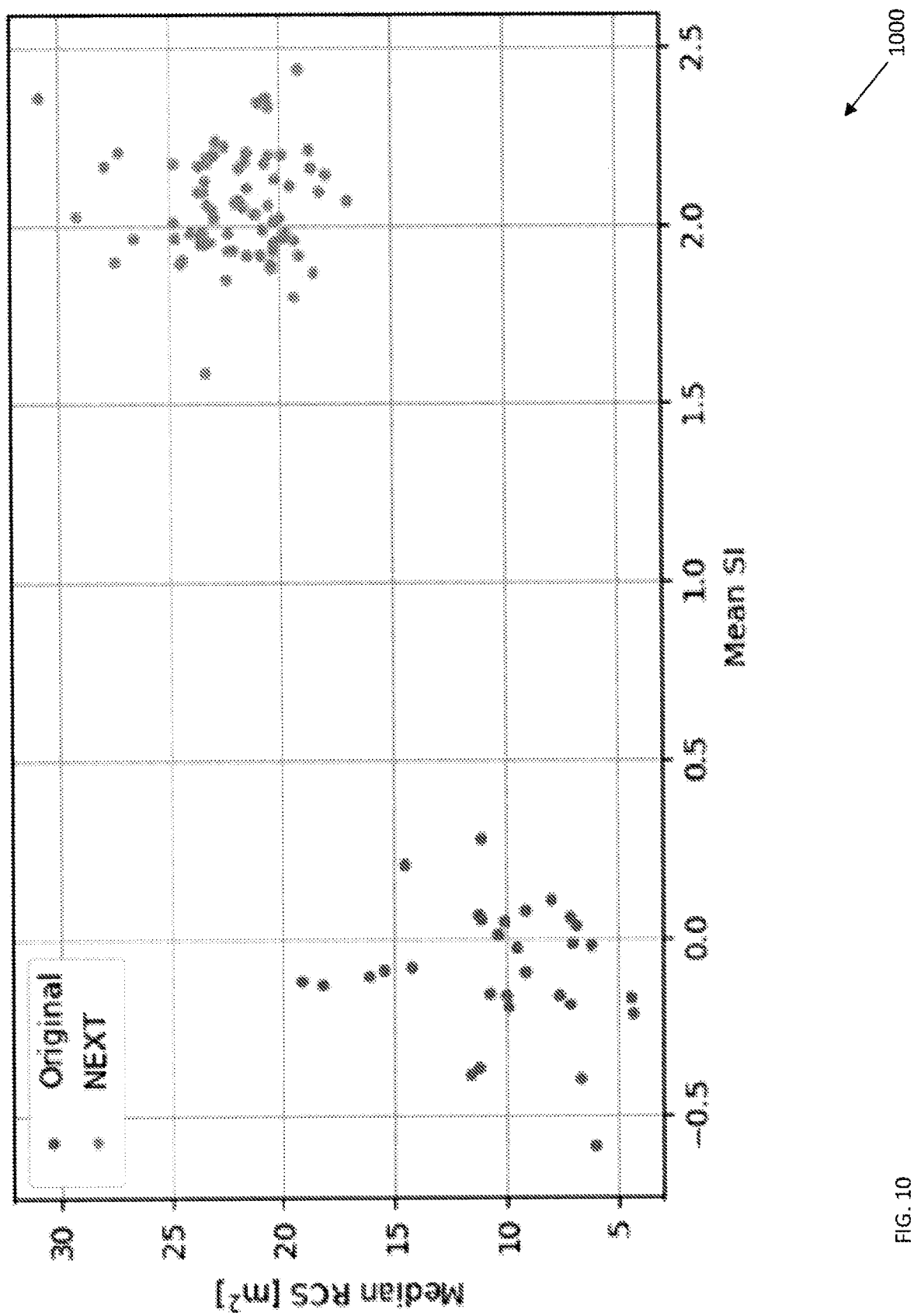

FIG. 10 shows a scatter plot 1000 of the median RCS for each Iridium satellite vs. the mean SI for that satellite. The original constellation is shown in blue, while the NEXT constellation is shown in orange. There is a striking separation between the two constellations on the SI axis, with the NEXT constellation showing very strong stability signal. Note that the lack of stability signal for the original constellation does not necessarily imply a lack of stability control for these satellites. An SI of zero can also indicate a stabilized satellite with near-isotropic RCS. Note that FIG. 10 shows median RCS and mean SI values for the Iridium satellites. The original constellation is shown in blue, while the NEXT constellation is orange. There is a clear separation between the two constellations.

4.3 Attitude Stability of Orbiting Rocket Bodies

A radar (e.g., LeoLabs radar) can track more than 700 RSOs in low-Earth orbit classified by CSpoC as rocket bodies. These are typically vehicle upper stages that were left in orbit after delivering their payloads. Many have been in orbit for decades.

Figure 11:
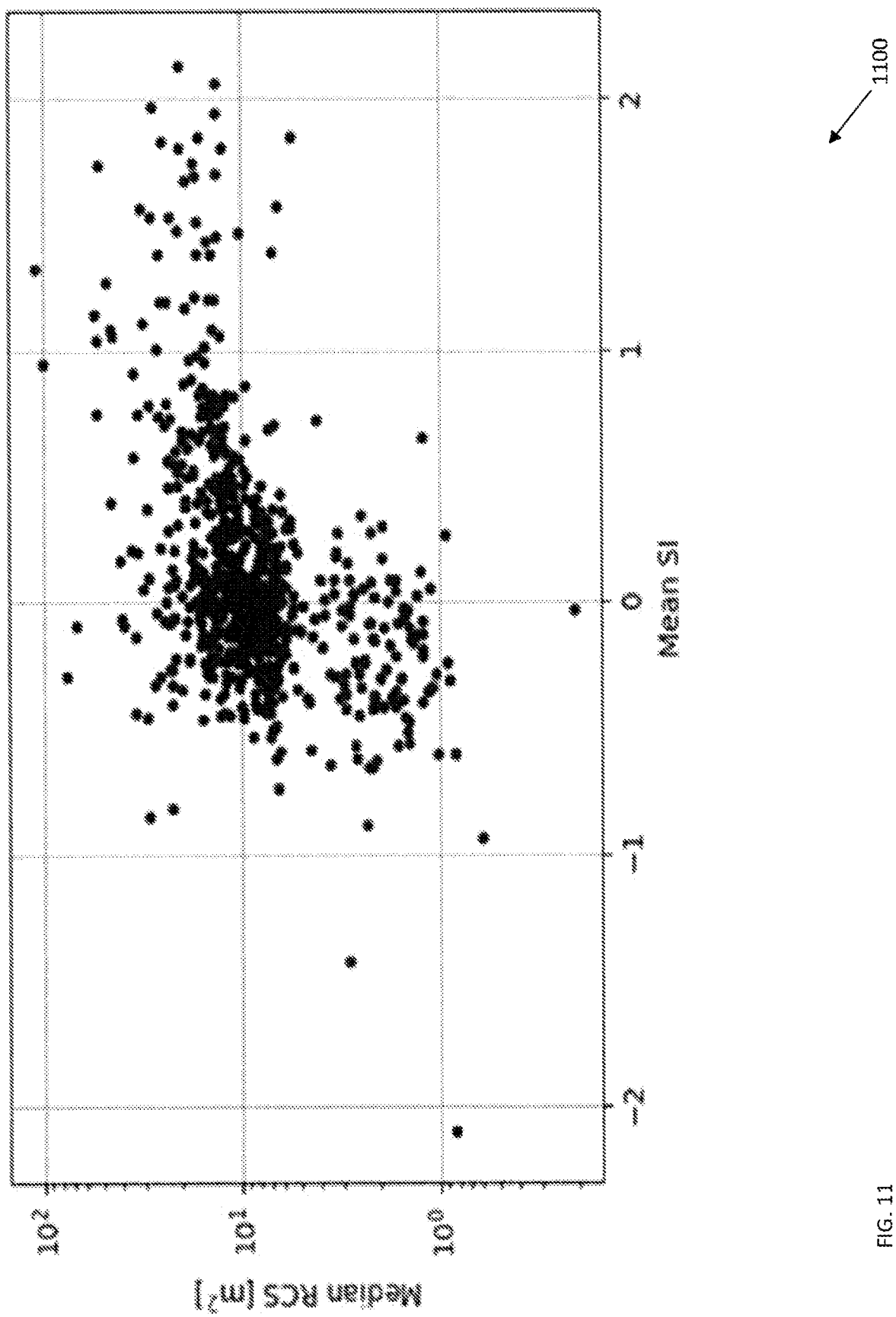

Sometimes, rocket bodies are not expected to have active attitude control after the payload has been delivered. Therefore, one might suppose that they have tumbling motion. FIG. 11 shows a diagram 1100 for median RCS vs. mean SI for 738 rocket bodies. Although the vast majority of the SIs are close to zero, there is an intriguing tale to the distribution with positive SIs. This indicates that a fraction of rocket bodies may, in fact, be in a state of passive stabilization. This can be consistent with theoretical studies of rocket body spin dynamics predicting that they may reach a state of passive stabilization. In the diagram 1100, median RCS and mean SI values for rocket bodies in LEO. Most of the objects have SI values near zero, however there is a significant number with high SI values. This can suggest that some rocket bodies have reached a state of passive stabilization.

4.4 Identification of Cosmos Constellations

Since 1962, the Soviet Union and Russian Federation have launched more than 2500 satellites with the designation Cosmos. These satellites have had a wide variety of purposes and orbits. Many of the satellites have since become inactive, but remain in orbit. One might naively expect the inactive satellites to eventually enter a state of tumbling motion. However, many of the Cosmos satellites used passive gravity-gradient stabilization. Assuming that the gravity-gradient booms of those satellites remain intact, it is likely that many of the older Cosmos satellites continue to be attitude stabilized.

Figure 12:
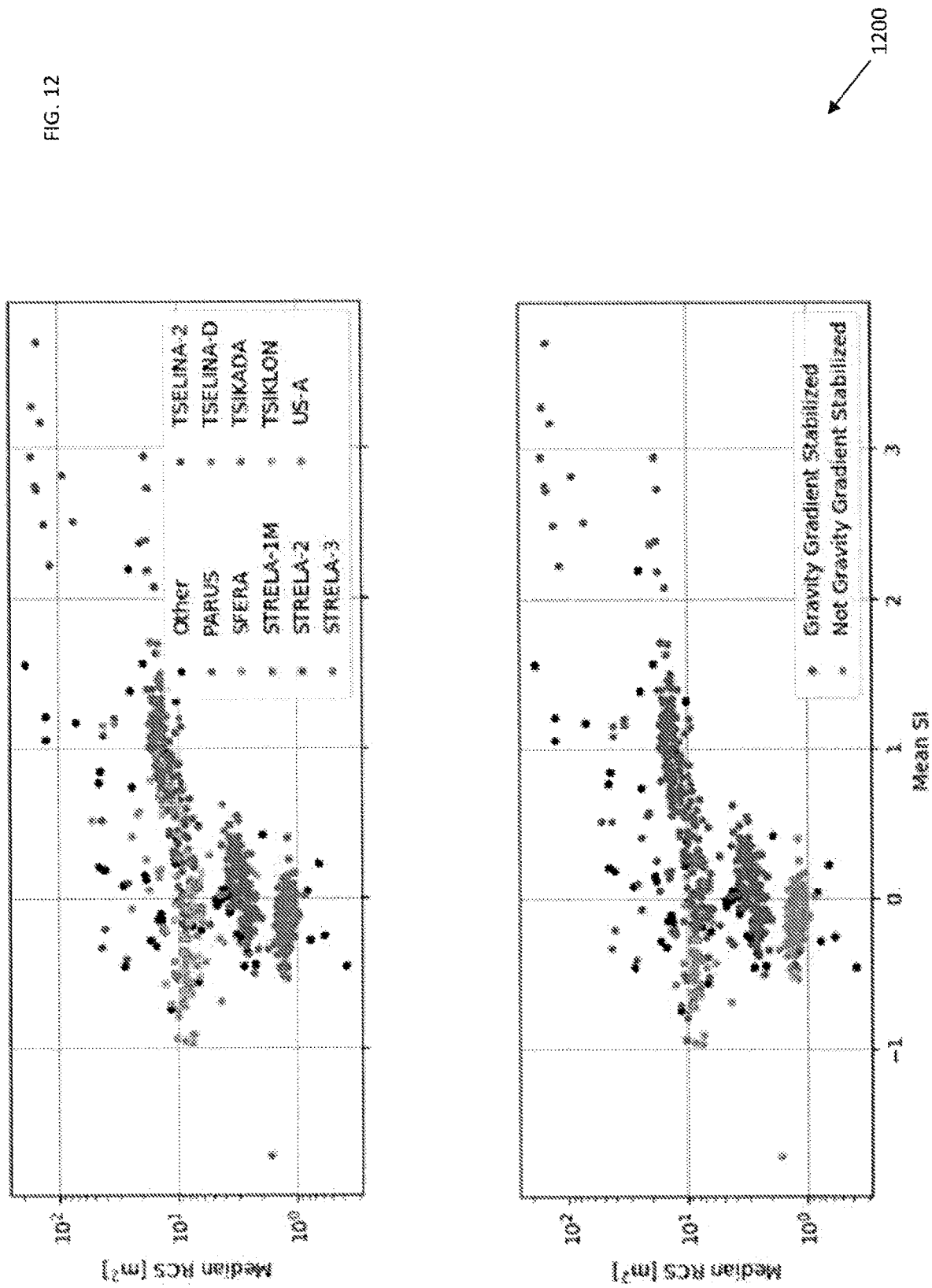

FIG. 12 shows a diagram 1220 with a median RCS vs. mean SI for the Cosmos satellites currently in LEO. In the top panel, the satellites have been color-coded to show to which constellation they belong. There are clear differences in the distributions for the various constellations. The bottom panel is color-coded for those constellations which are known to be gravity-gradient stabilized.

It is notable that the gravity-gradient stabilized constellations tend to show higher SIs than those that are not gravity-gradient stabilized. There are some gravity-gradient stabilized constellations that do not show high SIs, and this is consistent with those satellites having isotropic RCS distributions. This demonstrates that the RCS statistics, including the SI, have clear value for characterizing satellites in constellations. Note that FIG. 12 shows the diagram 1220 where median RCS and mean SI values for Cosmos payloads in LEO. In the top panel, the objects have been color-coded by parent constellation. The bottom panel shows the same objects, but color-coded by whether or not their parent constellation had a gravity-gradient stabilization design. The top panel illustrates that the various constellations have distinct RCS vs. SI properties, while the bottom panel illustrates the trend of higher SI values for gravity-gradient stabilized satellites.

5. FUTURE PERFORMANCE IMPROVEMENTS

Some of the results presented in this disclosure are using RCS data from a single radar site. This analysis can be augmented through the addition of RCS data from other radar sites. As such, the performance of this technique is expected to improve through at least two mechanisms: increased numbers of RCS measurements, and RCS measurements at different frequencies.

With additional radar sites, a given RSO will pass over the radar (e.g., LeoLabs radar) more times per day. This will provide a larger number of RCS measurements for each RSO. This will allow us to decrease the 60-day period for SI calculation and to decrease the SI thresholds, while maintaining a low false-positive rate. This will allow us to detect stability signatures from RSOs with less-pronounced RCS anisotropy or with frequent, controlled attitude changes.

Some radar sites (e.g., LeoLabs next generation of radar sites) operates at higher frequencies than the current generation. RCS is frequency-dependent, so the RCS isotropy of a given RSO may be different at the two radar frequencies. This implies the possibility that the SI for different RSOs may be more or less sensitive to attitude stability when measured at different radar frequencies. Therefore, there is an expectation to broaden the attitude stability sensitivity as more radar frequencies are added to the measurement suite.

CONCLUSION

A technique has been demonstrated for using RCS measurements to characterize the attitude stability of RSOs via a SI. Through a careful process of data characterization and Monte Carlo simulations, some thresholds to this SI have been successfully applied. This has allowed for labeling of RSOs in the data set with a stabilization classification.

In this technique, the use of SI has been demonstrated on a number of individual case studies and an ability to detect changes in attitude of active satellites, separate different constellations based on RCS and SI statistics, and detect passive stabilization of non-payload RSOs and inactive satellites has been shown. This capability should continue to improve as dedicated radar networks (e.g., LeoLabs) are continued to be built.

Figure 13:
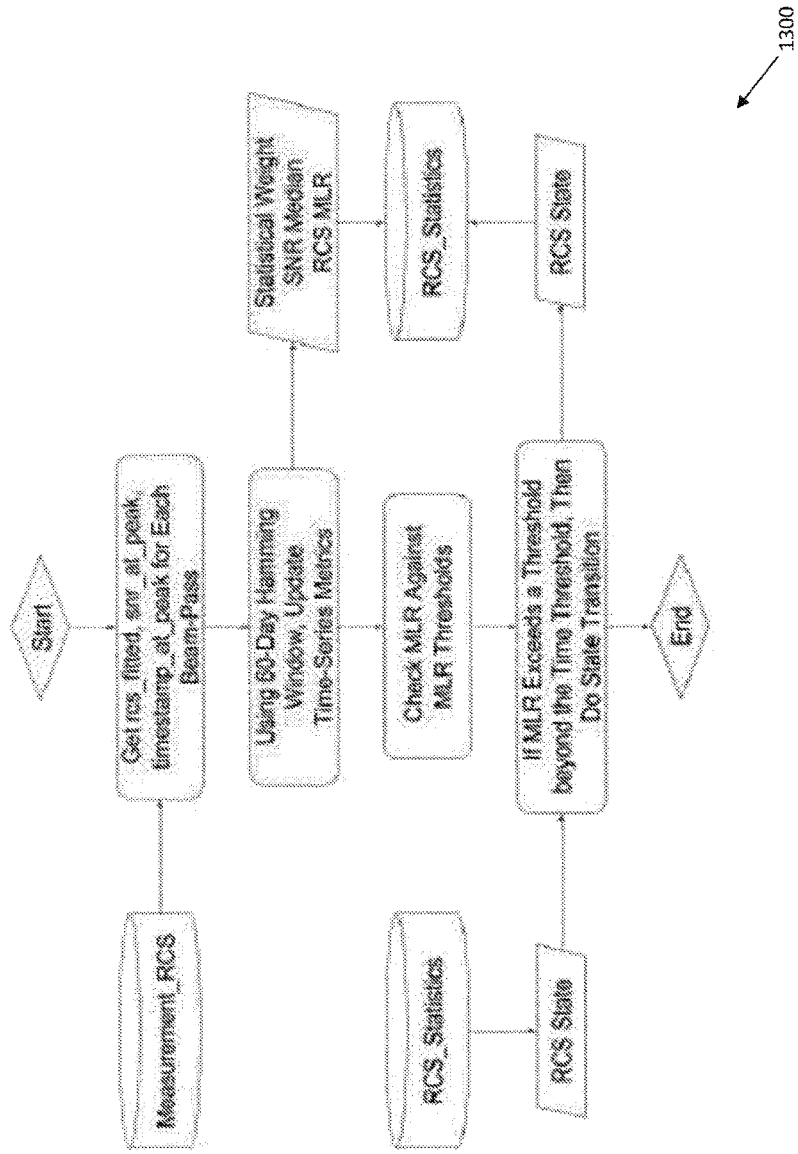
FIGS. 13-15 show an embodiment of a method for determining space object attitude stabilities from radar cross-section statistics according to this disclosure.
Figure 14:
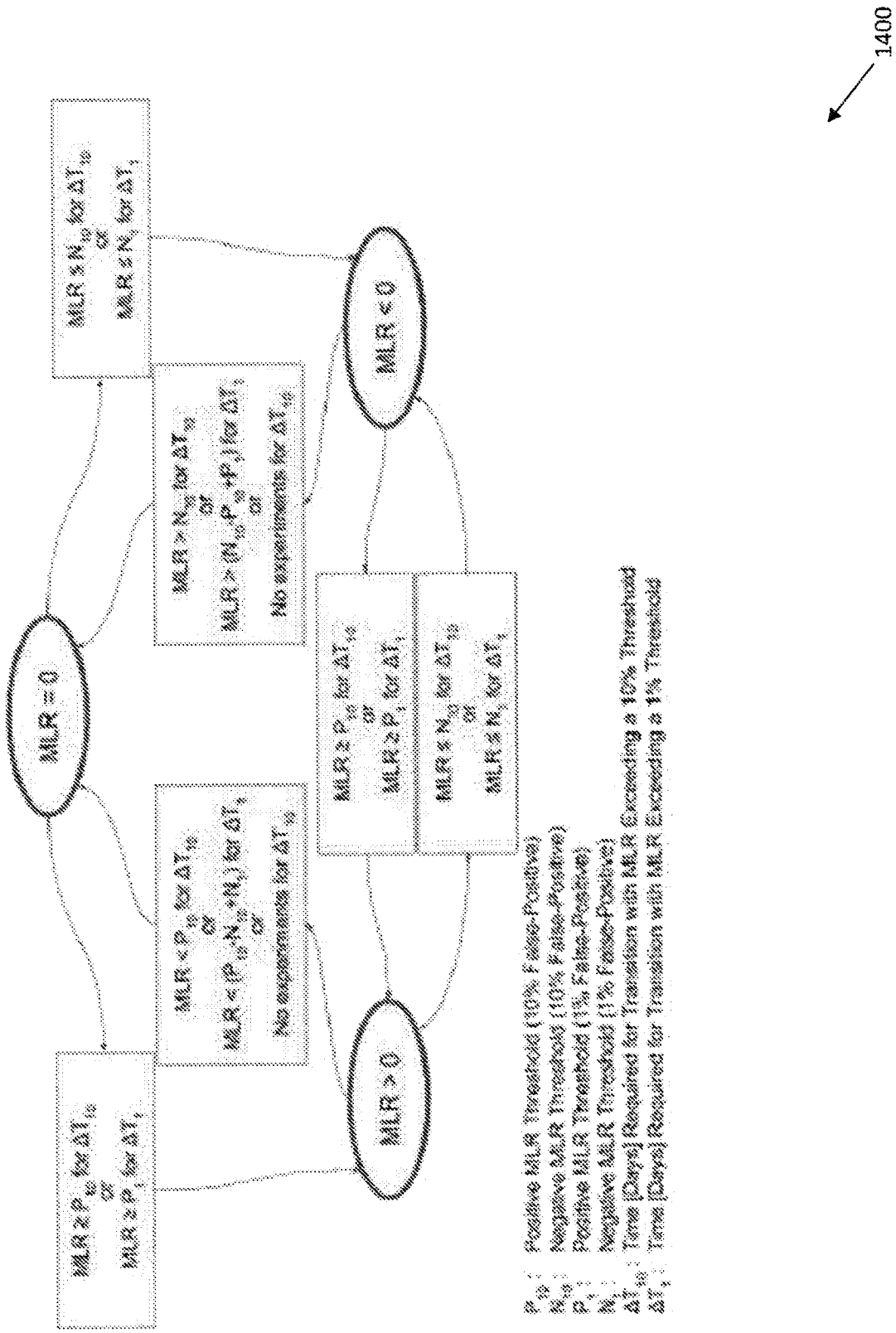
Figure 15:
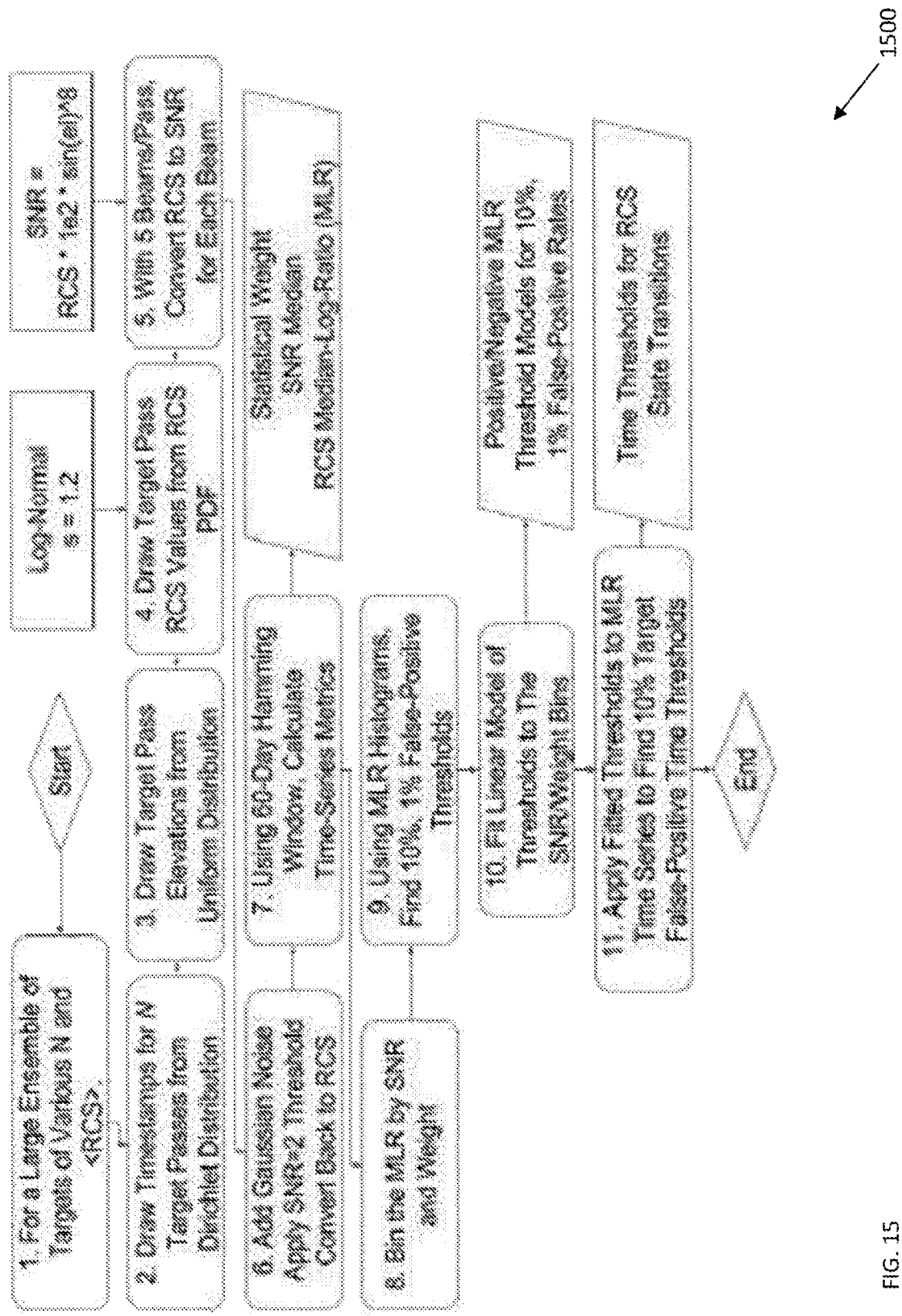

FIGS. 13-15 show an embodiment of a method for determining space object attitude stabilities from radar cross-section statistics according to this disclosure. In particular, FIG. 13 shows a flowchart for a data pipeline when a new RCS radar measurement is acquired. FIG. 14 shows a flowchart for an FSM. Note that a mean log ratio (MLR)>0 and MLR<0 states are considered attitude-stabilized, while the MLR=0 state is considered to be indeterminate. FIG. 15 is a flowchart of an FSM tuning procedure using a Monte Carlo simulation technique.

Note that some attitude-steerable satellites could be identified by performing additional statistics on the MLR stability state (and how it changes over time). Likewise, some satellites could be associated with given satellite constellations if their MLR statistics are similar (based on a criterion as known to skilled artisans) to the MLR statistics of other satellites in those constellations. Similarly, based on the RCS values from various radars at different frequencies, the processor can be used to increase the accuracy and precision of the techniques described herein. Also, in some embodiments, results from single radar side (e.g., Texas) and technique may improve with more radar sites and data therefrom. Moreover, radar measurements can be added (e.g., decrease 60-day median time scale, decrease SI thresholds). Additionally, radar frequencies can be added (e.g. RCS can be frequency dependent, giving complementary SI estimates).

Figure 16:
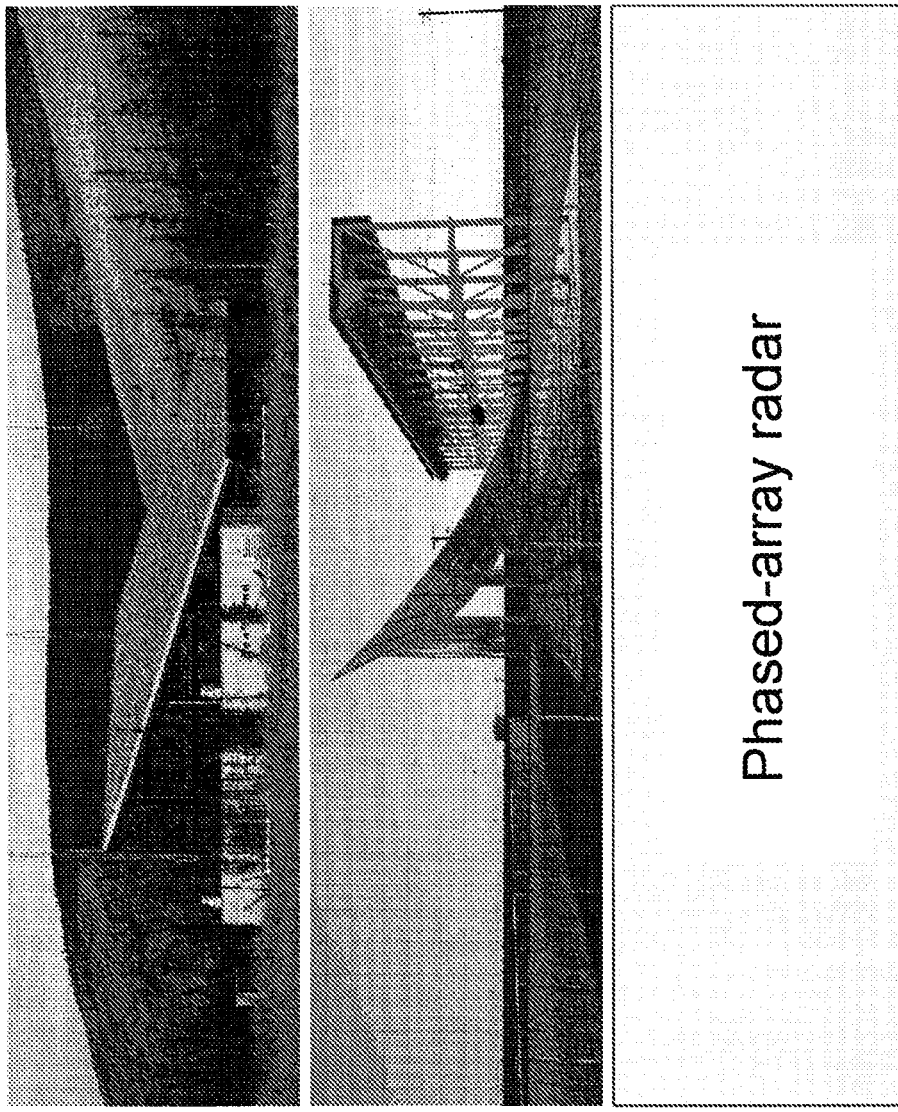
FIG. 16 shows an embodiment of a radar network with a plurality of radar installations according to this disclosure.

FIG. 16 shows an embodiment of a radar network with a plurality of radar installations according to this disclosure. In particular, the radar network can include the radar installations, whether positioned on same or different hemispheres or continents or bodies of water or vehicles, whether operably or modally same or different from each other. For example, the radar network can include the radar 106 in communication with the server 104. As shown, the radar installations include a plurality of phased-array radar installations located in Alaska, Texas, and New Zealand. For example, at least one of the phased-array radar installations includes a flat polygonal radar (e.g., Alaska) or a parabolic radar (e.g. Texas). However, these locations, operations, modalities, and structures are examples and other locations, operations, modalities, and structures are possible, as disclosed herein.

Figure 17:
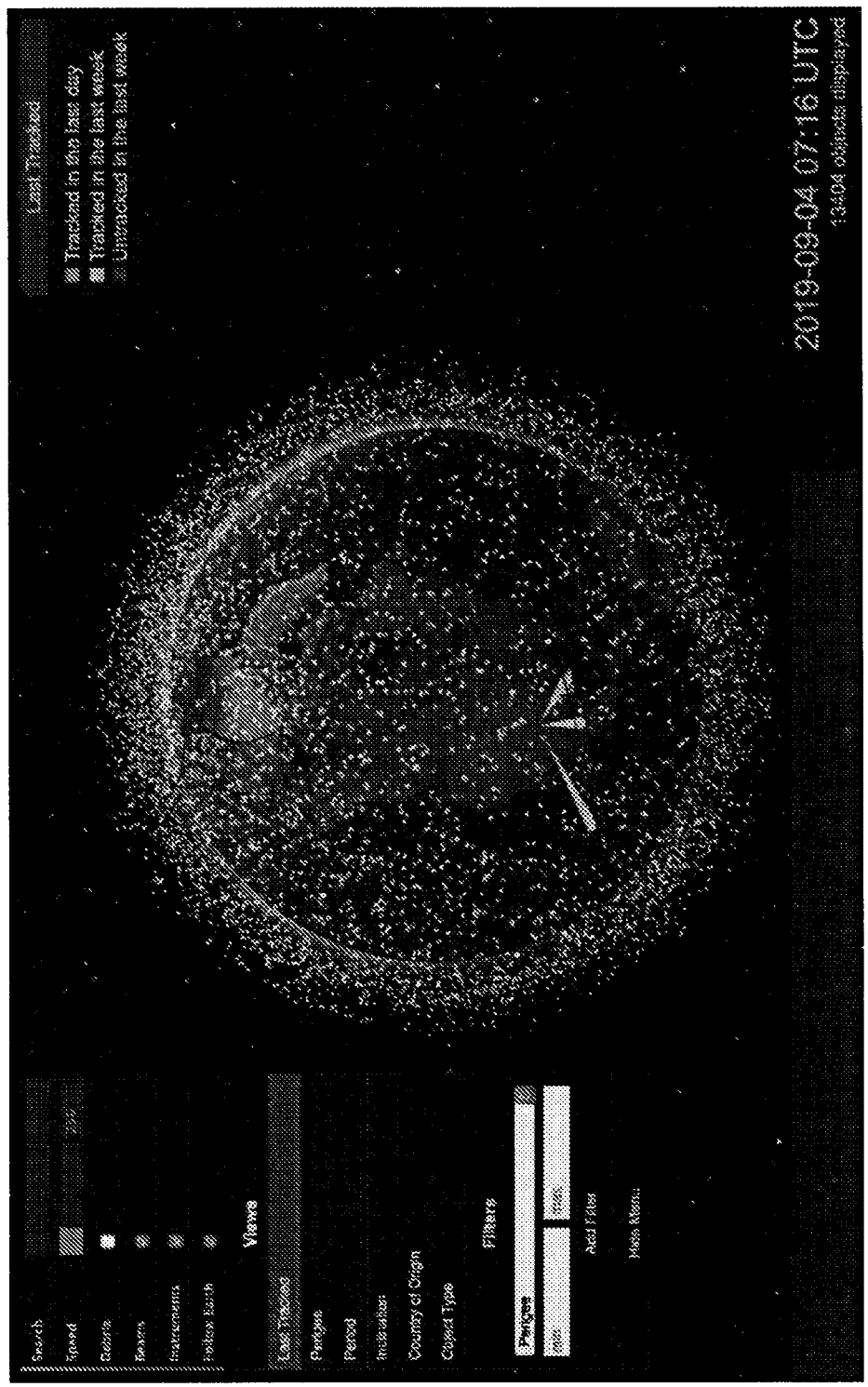
FIG. 17 shows an embodiment of a screenshot of a space object tracking software being sourced from a radar network according to this disclosure.

FIG. 17 shows an embodiment of a screenshot of a space object tracking software being sourced from a radar network according to this disclosure. In particular, the space object tracking software tracks a plurality of space objects (shown as green, yellow, and brown objects orbiting Earth object in screenshot) based on data sourced from the radar network, as disclosed herein. The space object tracking software has a set of user selectable filtering components (shown left of Earth object in screenshot) and a legend (shown right of Earth object in screenshot). The space object tracking software runs on the server 104 and is accessible via the client 102. The space object tracking software receives space object data from the radar 106, which can be or can be included in the radar network, as disclosed herein.

The screenshot shows a radar installation positioned in Alaska (multidimensional polygon shape beam) and a radar installation positioned in Texas (single dimension shape beam). Note that if the radar network has another radar installation, then that radar installation can have a multidimensional polygon shape beam or a single dimension shape beam, whether that radar installation is a phase-array radar or a non-phase-array radar. However, these locations, operations, modalities, and structures are examples and other locations, operations, modalities, and structures are possible, as disclosed herein.

Figure 18:
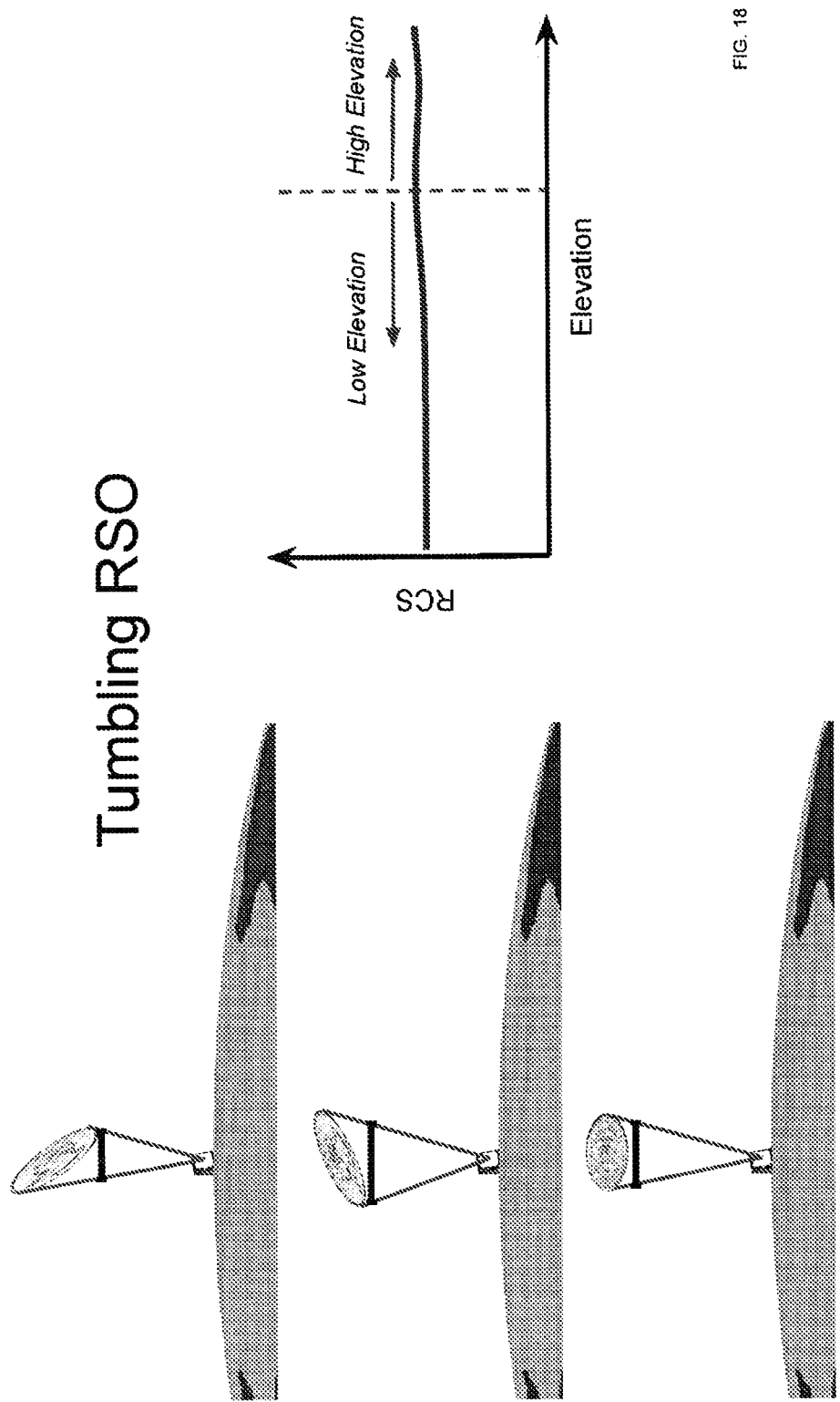
FIG. 18 shows a diagram of an embodiment of a tumbling RSO according to this disclosure.

FIG. 18 shows a diagram of an embodiment of a tumbling RSO according to this disclosure. The tumbling RSO has RCSs that dimensionally differ (horizontal line underneath RSO within radar beam) through time.

Figure 19:
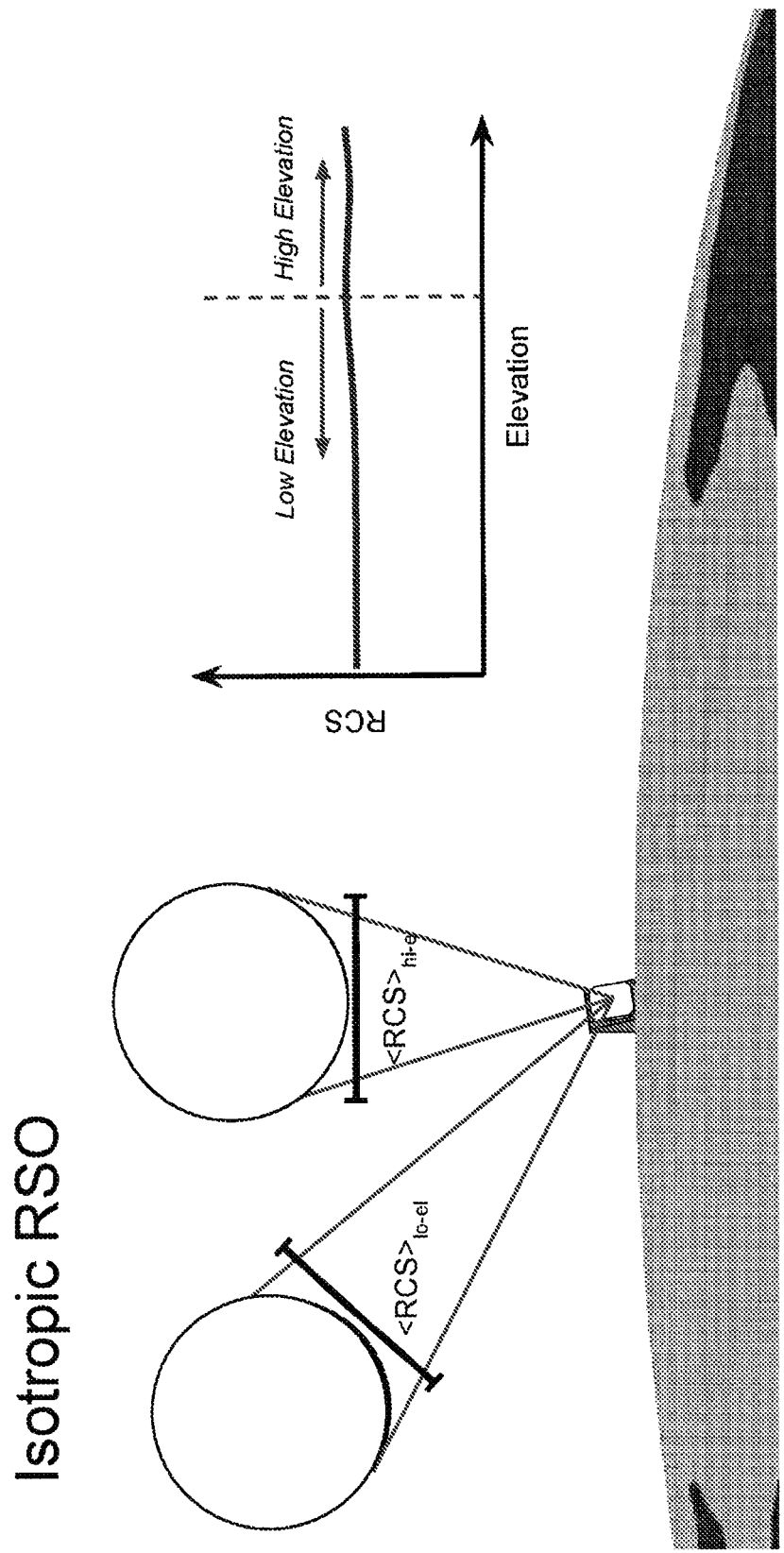
FIG. 19 shows a diagram of an embodiment of an isotropic RSO according to this disclosure.

FIG. 19 shows a diagram of an embodiment of an isotropic RSO according to this disclosure. The isotropic RSO has RCS that does not dimensionally differ (horizontal line underneath RSO within radar beam) through time.

FIG. 20 shows a diagram of an embodiment of RCS distribution according to this disclosure. In particular, a left chart shows a simulated RCS (y-axis) against a rotation measured in degrees (x-axis) and a right chart shows the left chart a PDF (y-axis) against a normalized RCS (x-axis), as disclosed herein.

FIG. 21 shows a diagram of an embodiment of an SI index according to this disclosure. In this embodiment, the SI index is equal to log[<RCS>hi-el/<RCS>lo-el]. Note that (1) the RCS weighted median over 60 days (e.g., reduces overall variance, effects of outlier RCS measurements), (2) the logarithm provides benefits (e.g., dynamic range for small or large differences in RCS, symmetric behavior for <RCS>hi-el greater/less than <RCS>lo-el), and (3) dynamically updated after new measurements, providing SI time series.

Figure 22:
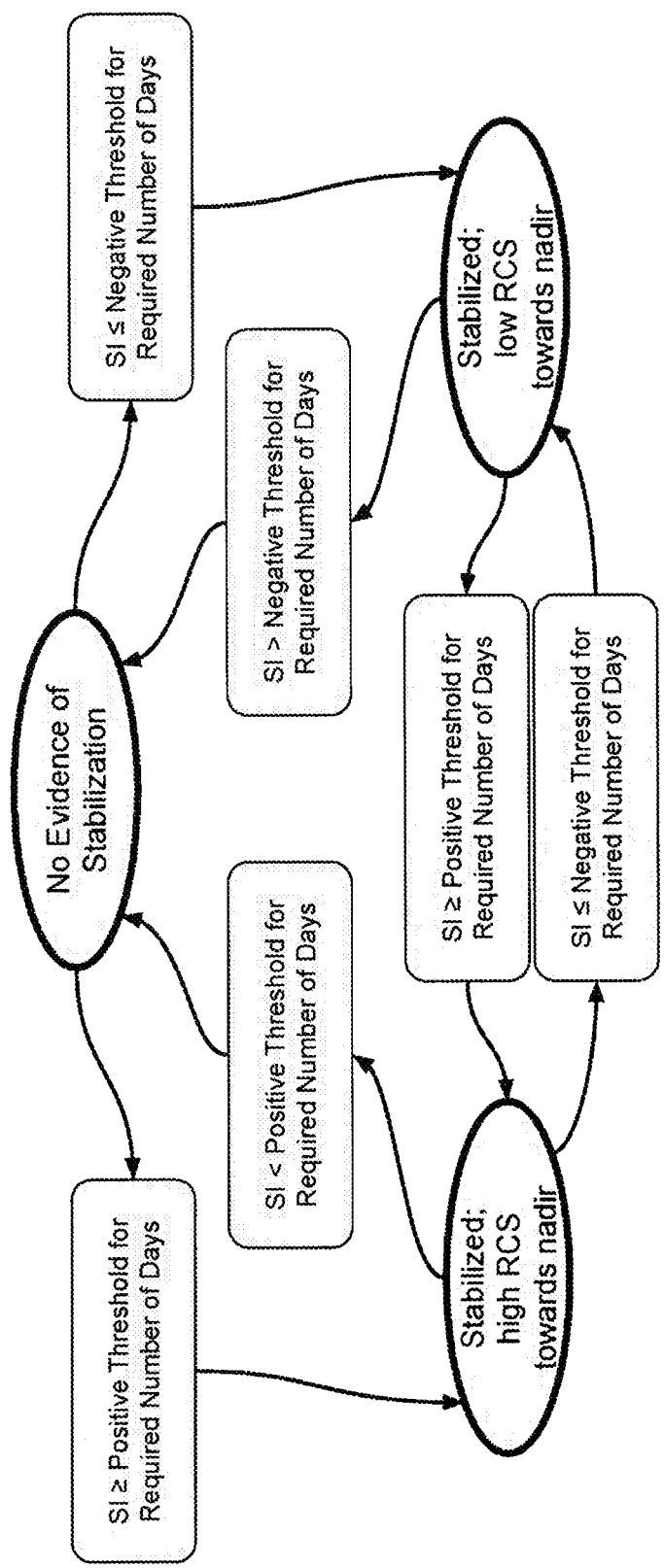
FIG. 22 shows a diagram an embodiment of an FSM according to this disclosure.

FIG. 22 shows a diagram an embodiment of an FSM according to this disclosure. The FSM is similar to FIG. 7 and based on SI data where ovals indicate space object states, as disclosed herein.

FIG. 23 shows a diagram of an embodiment of an SI for a plurality of space objects measured by date according to this disclosure. The SI (y-axis) is shown for Iridium space object and ESA space object. Note that black line indicates threshold and blue line indicates SI for that respective space object as measured against dates (x-axis)

FIG. 24 shows a diagram of an embodiment of a median RCS (y-axis) for a space object constellation measured by a mean SI (x-axis) according to this disclosure. The space object constellation is an Iridium constellation, but other space object constellations are possible. Note that blue dots (original) and orange dots (NEXT) represent different space objects within the Iridium constellation.

FIG. 25 shows a diagram of an embodiment of an SI (y-axis) measured by time (x-axis) for a threshold, an SI, and a stability state according to this disclosure. Note that the space object is a TDS-1 with drag sail being deployed for increasing a cross-sectional area of that space object and hence atmospheric drag to speed up reentry. This configuration affects RCS and SI, as disclosed herein.

Figure 26:
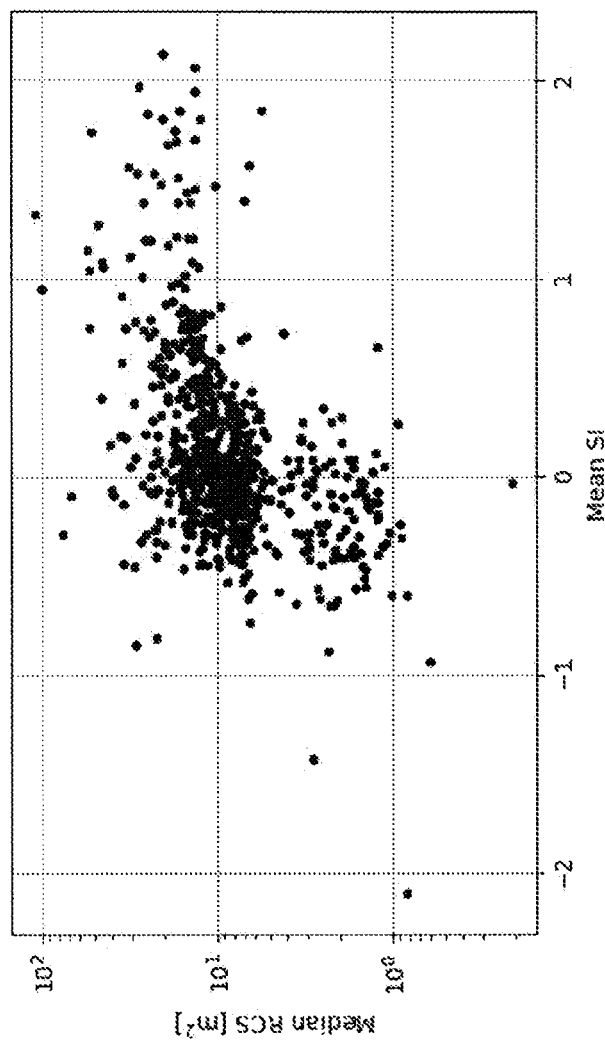
FIG. 26 shows a diagram of an embodiment of a median RCS against a mean SI for a plurality of rocket bodies according to this disclosure.

FIG. 26 shows a diagram of an embodiment of a median RCS (y-axis) against a mean SI (x-axis) for a plurality of rocket bodies according to this disclosure.

Figure 27:
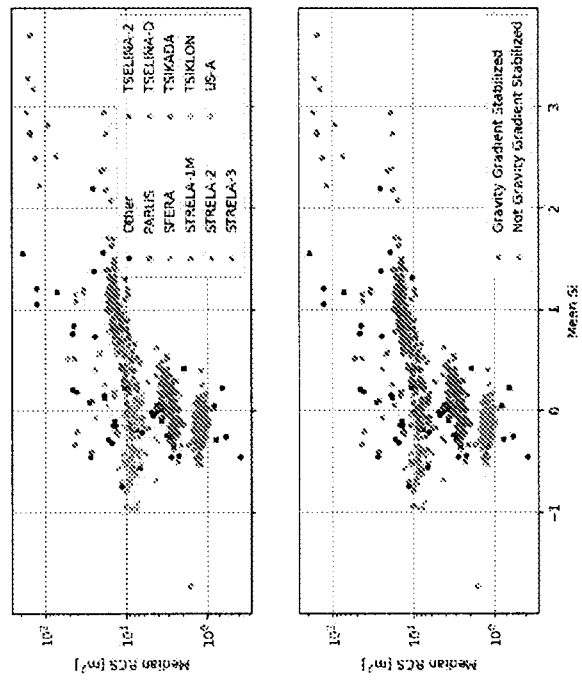
FIG. 27 shows a diagram of an embodiment of a median RCS against a mean SI for a space object constellation according to this disclosure.

FIG. 27 shows a diagram of an embodiment of a median RCS (y-axis) against a mean SI (x-axis) for a space object constellation according to this disclosure. Note that graphs are for same space objects, but indicate different concepts.

Figure 28:
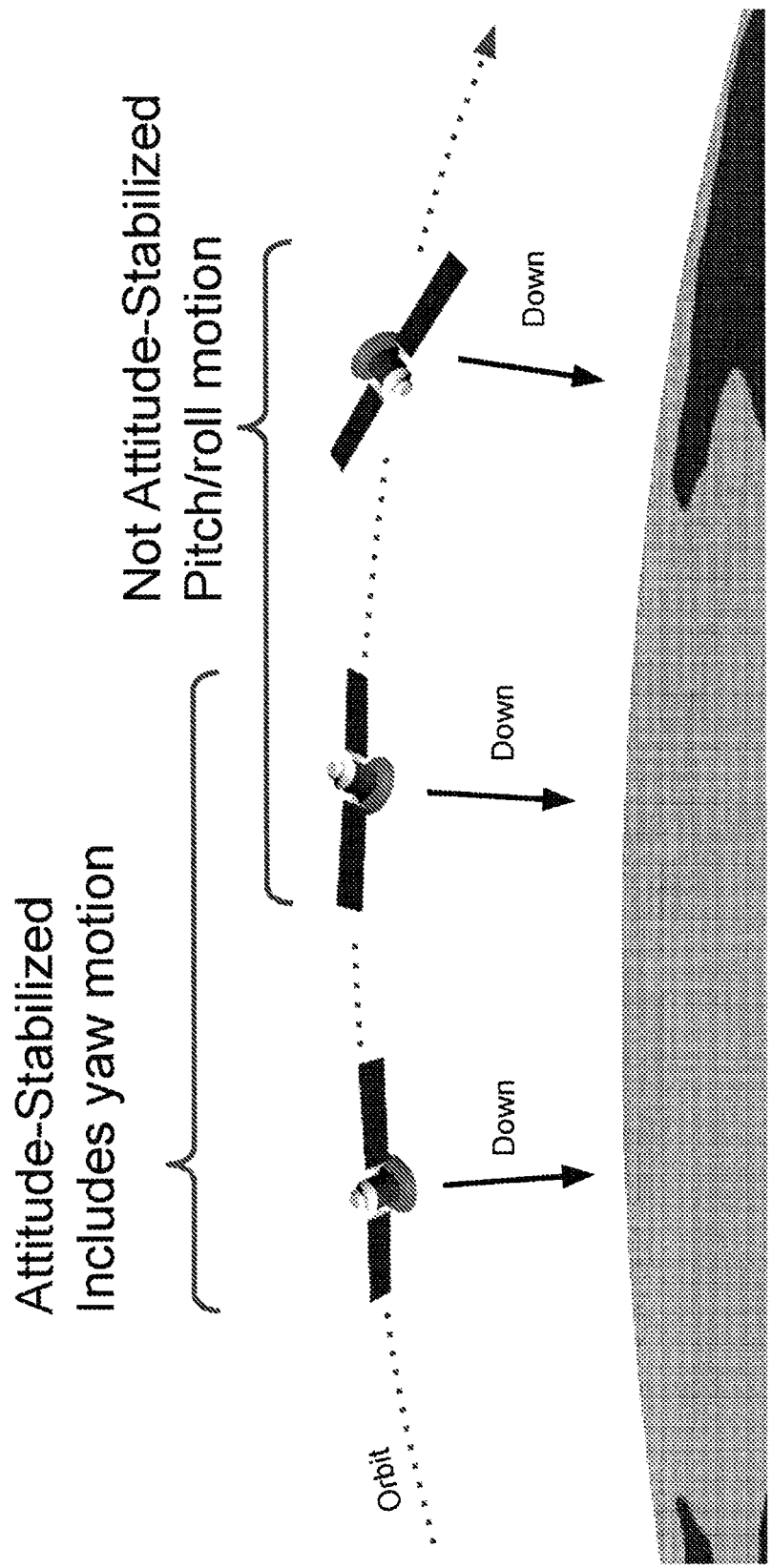
FIG. 28 shows a diagram of an embodiment of a plurality of states of a space object according to this disclosure.

FIG. 28 shows a diagram of an embodiment of a plurality of states of a space object according to this disclosure. As the space object orbits a planet (e.g., Earth), the space object can have attitude-stabilized state including a yaw motion and a non-attitude stabilized state including a pitch motion or a roll motion.

Also disclosed is a computer implemented method comprising the steps of: receiving, via a processor, a plurality of RCS measurements of a space object from a radar having a field of view, wherein the RCS measurements are obtained from a plurality of passes of the space object into the field of view; estimating, via the processor, a first expected RCS value based on the RCS measurements when the space object is within the field of view at a first elevation angle relative to the radar, and a second expected RCS value based on the RCS measurements when the space object is within the field of view at a second elevation angle relative to the radar, wherein the first elevation angle is greater than the second elevation angle; determining, via the processor, an SI based on the first expected RCS value and the second expected RCS value; receiving, via the processor, an RCS measurement from the radar when the space object is within the field of view at the first elevation angle or the second elevation angle, wherein the RCS measurement is received after the SI has been determined; inputting, via the processor, the SI into a FSM after the SI is updated based on the RCS measurement being slidably windowed, wherein the FSM tracks the space object between a plurality of states; and taking, via the processor, an action based on a change detected in one of the states.

Computer program code comprising instructions which, when the program is executed by a computer, cause the computer to carry out the steps of: receiving, via a processor, a plurality of RCS measurements of a space object from a radar having a field of view, wherein the RCS measurements are obtained from a plurality of passes of the space object into the field of view; estimating, via the processor, a first expected RCS value based on the RCS measurements when the space object is within the field of view at a first elevation angle relative to the radar, and a second expected RCS value based on the RCS measurements when the space object is within the field of view at a second elevation angle relative to the radar, wherein the first elevation angle is greater than the second elevation angle; determining, via the processor, an SI based on the first expected RCS value and the second expected RCS value; receiving, via the processor, an RCS measurement from the radar when the space object is within the field of view at the first elevation angle or the second elevation angle, wherein the RCS measurement is received after the SI has been determined; inputting, via the processor, the SI into a FSM after the SI is updated based on the RCS measurement being slidably windowed, wherein the FSM tracks the space object between a plurality of states; and taking, via the processor, an action based on a change detected in one of the states.

Computer-readable medium or a data carrier provided with computer program code as above. A computer program product comprising instructions which, when the program is executed by a computer, cause the computer to carry out the steps of: receiving, via a processor, a plurality of RCS measurements of a space object from a radar having a field of view, wherein the RCS measurements are obtained from a plurality of passes of the space object into the field of view; estimating, via the processor, a first expected RCS value based on the RCS measurements when the space object is within the field of view at a first elevation angle relative to the radar, and a second expected RCS value based on the RCS measurements when the space object is within the field of view at a second elevation angle relative to the radar, wherein the first elevation angle is greater than the second elevation angle; determining, via the processor, an SI based on the first expected RCS value and the second expected RCS value; receiving, via the processor, an RCS measurement from the radar when the space object is within the field of view at the first elevation angle or the second elevation angle, wherein the RCS measurement is received after the SI has been determined; inputting, via the processor, the SI into a FSM after the SI is updated based on the RCS measurement being slidably windowed, wherein the FSM tracks the space object between a plurality of states; and taking, via the processor, an action based on a change detected in one of the states.

Any of the above computer programs or computer implemented methods wherein a ground-based radar is controlled to perform the plurality of RCS measurements. There is also disclosed a system comprising: a server programmed to: receive a plurality of RCS measurements of a space object from a radar having a field of view, wherein the RCS measurements are obtained from a plurality of passes of the space object into the field of view; estimate a first expected RCS value based on the RCS measurements when the space object is within the field of view at a first elevation angle relative to the radar, and a second expected RCS value based on the RCS measurements when the space object is within the field of view at a second elevation angle relative to the radar, wherein the first elevation angle is greater than the second elevation angle; determine an SI based on the first expected RCS value and the second expected RCS value; receive an RCS measurement from the radar when the space object is within the field of view at the first elevation angle or the second elevation angle, wherein the RCS measurement is received after the SI has been determined; input the SI into a FSM after the SI is updated based on the RCS measurement being slidably windowed, wherein the FSM tracks the space object between a plurality of states; and take an action based on a change detected in one of the states.

In some embodiments of this system, there is further provided a radar controller configured to control a ground-based radar to perform the plurality of RCS measurements. There is also disclosed computer program code, computer implemented methods, computers, computer readable mediums and data carriers provided with computer program code capable of performing or causing performance of the various steps in the claims which follow.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Although preferred embodiments have been depicted and described in detail herein, those skilled in the relevant art will appreciate that various modifications, additions, substitutions and the like can be made without departing from the spirit of the disclosure, and these are, therefore, considered to be within the scope of the disclosure, as defined in the following claims.

What is claimed is:

1. A method comprising:
receiving, via a processor, a plurality of radar cross-section (RCS) measurements of a space object from a radar having a field of view, wherein the RCS measurements are obtained from a plurality of passes of the space object into the field of view;
estimating, via the processor, a first expected RCS value based on the RCS measurements when the space object is within the field of view at a first elevation angle relative to the radar, and a second expected RCS value based on the RCS measurements when the space object is within the field of view at a second elevation angle relative to the radar, wherein the first elevation angle is greater than the second elevation angle;
determining, via the processor, a stability index (SI) based on the first expected RCS value and the second expected RCS value;
receiving, via the processor, an RCS measurement from the radar when the space object is within the field of view at the first elevation angle or the second elevation angle, wherein the RCS measurement is received after the SI has been determined;
inputting, via the processor, the SI updated based on the RCS measurement being slidably windowed into a finite state machine (FSM), wherein the FSM tracks the space object between a plurality of states; and
taking, via the processor, an action based on a change detected in one of the states.

2. The method of claim 1, wherein the radar is a phased-array radar.

3. The method of claim 1, wherein the states include an attitude-stabilized state and an indeterminant state.

4. The method of claim 1, wherein the FSM transitions between the states via a comparison between the SI after the SI has been updated and at least one of an amplitude threshold or a time-based threshold.

5. The method of claim 4, wherein the comparison is between the SI after the SI has been updated and the amplitude threshold.

6. The method of claim 4, wherein the comparison is between the SI after the SI has been updated and the time-based threshold.

7. The method of claim 4, wherein the comparison is between the SI after the SI has been updated and both the amplitude threshold and the time-based threshold.

8. The method of claim 1, wherein the FSM transitions between the states via a comparison between the SI before the SI has been updated and at least one of an amplitude threshold or a time-based threshold.

9. The method of claim 8, wherein the comparison is between the SI before the SI has been updated and the amplitude threshold.

10. The method of claim 8, wherein the comparison is between the SI before the SI has been updated and the time-based threshold.

11. The method of claim 8, wherein the comparison is between the SI before the SI has been updated and both the amplitude threshold and the time-based threshold.

12. The method of claim 1, wherein the FSM transitions between the states via a comparison between the SI after the SI has been updated, the SI before the SI has been updated, an amplitude threshold, and a time-based threshold.

13. The method of claim 1, wherein the FSM includes a plurality of thresholds that are tuned via a random sampling simulation algorithm.

14. The method of claim 13, wherein the random sampling simulation algorithm includes a Monte Carlo simulation.

15. The method of claim 1, wherein one of the states is an attitude-stabilized state, wherein the change is detected in the attitude-stabilized state.

16. The method of claim 15, wherein the action includes triggering a software event associated with the change.

17. The method of claim 16, wherein the software event is accessible via a front-end application programming interface (API) associated with the processor.

18. The method of claim 1, wherein the space object includes a plurality of photovoltaic panels that are deployed.

19. The method of claim 1, wherein the space object is non-spherical.

20. The method of claim 1, wherein the RCS measurement is measured via the radar when the space object is within the field of view at the first elevation angle.

21. The method of claim 1, wherein the RCS measurement is measured via the radar when the space object is within the field of view at the second elevation angle.

22. The method of claim 1, wherein the action includes participating, via the processor, in an identification of an attitude-steerable space object.

23. The method of claim 22, wherein the space object is the attitude-steerable space object.

24. The method of claim 1, wherein the radar is of a radar network including a plurality of radar sites.

25. The method of claim 24, wherein at least two of the sites are ground-based and are in different locations.

26. The method of claim 24, wherein each of the radar sites includes a phased-array radar.

27. The method of claim 1, wherein the SI is a first SI, wherein the action includes associating, via the processor, the space object with a constellation of space objects based on the first SI being sufficiently similar to a second SI based on a criterion, wherein at least one member of the constellation of space objects is associated with the second SI.

28. The method of claim 1, wherein the first expected RCS value is a median value.

29. The method of claim 1, wherein the first expected RCS value is an mean value.

30. The method of claim 1, wherein the second expected RCS value is a median value.

31. The method of claim 1, wherein the second expected RCS value is an mean value.

32. The method of claim 1, wherein the SI is based on a ratio of the first expected RCS and the second expected RCS value.

33. The method of claim 32, wherein the SI is based on a logarithm of the ratio.

34. A system comprising:
a server programmed to:
receive a plurality of radar cross-section (RCS) measurements of a space object from a radar having a field of view, wherein the RCS measurements are obtained from a plurality of passes of the space object into the field of view;
estimate a first expected RCS value based on the RCS measurements when the space object is within the field of view at a first elevation angle relative to the radar, and a second expected RCS value based on the RCS measurements when the space object is within the field of view at a second elevation angle relative to the radar, wherein the first elevation angle is greater than the second elevation angle;
determine a stability index (SI) based on the first expected RCS value and the second expected RCS value;
receive an RCS measurement from the radar when the space object is within the field of view at the first elevation angle or the second elevation angle, wherein the RCS measurement is received after the SI has been determined;
input the SI updated based on the RCS measurement being slidably windowed into a finite state machine (FSM), wherein the FSM tracks the space object between a plurality of states; and
take an action based on a change detected in one of the states.

* * * * *